(12) United States Patent
Cobb et al.

(10) Patent No.: US 10,120,194 B2
(45) Date of Patent: Nov. 6, 2018

(54) WIDE FIELD PERSONAL DISPLAY

(71) Applicant: Corning Incorporated, Corning, NY (US)

(72) Inventors: Joshua Monroe Cobb, Victor, NY (US); Kevin J Magierski, Victor, NY (US)

(73) Assignee: Corning Incorporated, Corning, NY (US)

( * ) Notice: Subject to any disclaimer, the term of this patent is extended or adjusted under 35 U.S.C. 154(b) by 3 days.

(21) Appl. No.: 15/869,745

(22) Filed: Jan. 12, 2018

(65) Prior Publication Data
US 2018/0136473 A1    May 17, 2018

Related U.S. Application Data

(63) Continuation of application No. 15/411,179, filed on Jan. 20, 2017.
(Continued)

(51) Int. Cl.
*G02B 1/11* (2015.01)
*G02B 17/08* (2006.01)
(Continued)

(52) U.S. Cl.
CPC ......... *G02B 27/0172* (2013.01); *G02B 1/041* (2013.01); *G02B 1/11* (2013.01);
(Continued)

(58) Field of Classification Search
CPC .. G02B 17/023; G02B 17/06; G02B 17/0856; G02B 17/086; G02B 27/01;
(Continued)

(56) References Cited

U.S. PATENT DOCUMENTS

| 3,498,725 A | 3/1970 | Burrows et al. |
| 3,940,204 A | 2/1976 | Withrington |
| (Continued) |

FOREIGN PATENT DOCUMENTS

| CA | 2233047 C | 9/2000 |
| CA | 2265092 A1 | 9/2000 |
| (Continued) |

OTHER PUBLICATIONS

International Search Report and Written Opinion of the International Searching Authority; PCT/US2017/014050; dated Jun. 27, 2017; 26 Pages; European Patent Office.
(Continued)

*Primary Examiner* — Loha Ben
(74) *Attorney, Agent, or Firm* — Svetlana Z. Short

(57) ABSTRACT

A display apparatus has an image generator that generates image-bearing light from a f surface and a lens spaced apart from the image generator and having an aspheric incident refractive surface concave to the image generator and having an aspheric reflective surface concave to the image generator, wherein a principal axis of the reflective surface is normal to the image generator. A beam splitter plate disposed in free space between the image generator and the lens has first and second parallel surfaces that are oblique to a line of sight of a viewer. The lens and the beam splitter plate define a viewer eye box for the image-bearing light along the line of sight of the viewer.

30 Claims, 24 Drawing Sheets

Related U.S. Application Data

(60) Provisional application No. 62/286,019, filed on Jan. 22, 2016, provisional application No. 62/406,674, filed on Oct. 11, 2016, provisional application No. 62/397,138, filed on Sep. 20, 2016.

(51) Int. Cl.
*G02B 27/01* (2006.01)
*G02B 27/10* (2006.01)
*G02B 1/18* (2015.01)
*G02B 1/04* (2006.01)
*G02B 5/30* (2006.01)
*G02B 27/28* (2006.01)
*G02B 27/00* (2006.01)

(52) U.S. Cl.
CPC ............. *G02B 1/18* (2015.01); *G02B 5/3083* (2013.01); *G02B 17/086* (2013.01); *G02B 17/0856* (2013.01); *G02B 27/0006* (2013.01); *G02B 27/0176* (2013.01); *G02B 27/0179* (2013.01); *G02B 27/1066* (2013.01); *G02B 27/283* (2013.01); *G02B 2027/011* (2013.01); *G02B 2027/0132* (2013.01); *G02B 2027/0138* (2013.01); *G02B 2027/0154* (2013.01)

(58) Field of Classification Search
CPC ............. G02B 27/0101; G02B 27/017; G02B 27/0172; G02B 27/0176; G02B 27/1066; G02B 27/14; G02B 27/149; G02B 27/12; G02B 27/22; G02B 27/2292; G02B 27/283; G02B 2027/0118; G02B 1/041; G02B 1/11; G02B 1/18; G02B 27/0006; G02B 27/0179; G02B 2027/011; G02B 2027/0132; G02B 2027/0138; G02B 2027/0154; G09G 5/00; G01J 3/28; H04N 5/74; H04N 5/7408; H04N 5/7416; H04N 5/7441; H04N 13/00; H04N 13/0003; H04N 13/0007
USPC ........ 359/449, 462, 464–466, 471, 478, 479, 359/485.01, 629–631, 633, 634; 348/42, 348/43, 46, 47, 49, 51, 53, 115, E13.022, 348/E13.023, E13.041, E13.042, E13.045; 345/6–9; 353/10, 20, 34, 98
See application file for complete search history.

(56) References Cited

U.S. PATENT DOCUMENTS

| | | |
|---|---|---|
| 4,461,542 A | 7/1984 | Gagnon |
| 4,805,988 A | 2/1989 | Dones |
| 4,852,988 A | 8/1989 | Velez et al. |
| 4,897,715 A | 1/1990 | Beamon, III |
| 4,961,626 A | 10/1990 | Fournier, Jr. et al. |
| 4,969,714 A | 11/1990 | Fournier, Jr. et al. |
| 5,035,474 A | 7/1991 | Moss et al. |
| 5,164,848 A | 11/1992 | Firth et al. |
| 5,293,271 A | 3/1994 | Merritt et al. |
| 5,305,124 A * | 4/1994 | Chern ................. G02B 17/023 348/E5.138 |
| 5,341,242 A | 8/1994 | Gilboa et al. |
| 5,348,477 A | 9/1994 | Welch et al. |
| 5,355,181 A | 10/1994 | Ashizaki et al. |
| 5,396,349 A | 3/1995 | Roberts et al. |
| 5,459,612 A | 10/1995 | Ingleton |
| 5,467,205 A | 11/1995 | Kuba et al. |
| 5,486,841 A | 1/1996 | Hara et al. |
| 5,499,138 A | 3/1996 | Iba |
| 5,499,139 A | 3/1996 | Chen et al. |
| 5,515,070 A | 5/1996 | Kawada |
| 5,539,422 A | 7/1996 | Heacock et al. |
| 5,543,816 A | 8/1996 | Heacock |
| 5,546,492 A | 8/1996 | Ansley et al. |
| 5,579,161 A | 11/1996 | Sekiguchi |
| 5,585,946 A * | 12/1996 | Chern ...................... H04N 9/30 348/E9.024 |
| 5,610,765 A | 3/1997 | Colucci |
| 5,661,604 A | 8/1997 | Kuba |
| 5,663,833 A | 9/1997 | Nanba et al. |
| 5,708,529 A | 1/1998 | Togino et al. |
| 5,739,955 A | 4/1998 | Marshall |
| 5,748,375 A | 5/1998 | Yamana |
| 5,751,493 A * | 5/1998 | Hur ...................... G02B 27/017 348/E13.022 |
| 5,815,126 A | 9/1998 | Fan et al. |
| 5,820,240 A | 10/1998 | Ohzawa |
| 5,822,127 A | 10/1998 | Chen et al. |
| 5,838,490 A | 11/1998 | Fritz |
| 5,859,624 A | 1/1999 | Matsumoto et al. |
| 5,886,818 A * | 3/1999 | Summer ................ G02B 27/22 348/E13.022 |
| 5,886,822 A | 3/1999 | Spitzer |
| 5,926,318 A | 7/1999 | Hebert |
| 5,926,321 A | 7/1999 | Shikama |
| 5,943,171 A | 8/1999 | Budd et al. |
| 5,969,871 A | 10/1999 | Tidwell et al. |
| 5,982,343 A | 11/1999 | Iba et al. |
| 5,984,477 A | 11/1999 | Weissman et al. |
| 5,999,147 A | 12/1999 | Teitel |
| 5,999,237 A | 12/1999 | Miyawaki |
| 6,008,780 A | 12/1999 | Clarke et al. |
| 6,008,945 A | 12/1999 | Fergason |
| 6,008,947 A | 12/1999 | Togino |
| 6,014,261 A | 1/2000 | Takahashi |
| 6,023,373 A | 2/2000 | Inoguchi et al. |
| 6,072,632 A | 6/2000 | Ophey |
| 6,081,304 A | 6/2000 | Kuriyama et al. |
| 6,084,555 A | 7/2000 | Mizoguchi et al. |
| 6,094,309 A | 7/2000 | Ophey |
| 6,101,038 A | 8/2000 | Hebert et al. |
| 6,144,439 A | 11/2000 | Carollo |
| 6,147,805 A | 11/2000 | Fergason |
| 6,204,975 B1 | 3/2001 | Watters et al. |
| 6,215,532 B1 | 4/2001 | Takagi et al. |
| 6,222,677 B1 | 4/2001 | Budd et al. |
| 6,246,383 B1 | 6/2001 | Ophey |
| 6,282,029 B1 | 8/2001 | Ma et al. |
| 6,292,305 B1 | 9/2001 | Sakuma et al. |
| 6,304,303 B1 | 10/2001 | Yamanaka |
| 6,342,871 B1 | 1/2002 | Takeyama |
| 6,353,503 B1 | 3/2002 | Spitzer et al. |
| 6,366,400 B1 | 4/2002 | Ohzawa |
| 6,369,952 B1 | 4/2002 | Rallison et al. |
| 6,375,327 B2 * | 4/2002 | Holman ............. G03B 21/2073 349/9 |
| 6,400,493 B1 | 6/2002 | Mertz et al. |
| 6,421,183 B1 | 7/2002 | Ophey |
| 6,462,882 B2 | 10/2002 | Chen et al. |
| 6,487,021 B1 | 11/2002 | Ophey |
| 6,488,389 B2 | 12/2002 | Cassarly et al. |
| 6,490,095 B2 | 12/2002 | Okuyama et al. |
| 6,519,090 B2 | 2/2003 | Endo et al. |
| 6,520,643 B1 * | 2/2003 | Holman ............. G03B 21/2073 349/9 |
| 6,522,474 B2 | 2/2003 | Cobb et al. |
| 6,535,183 B2 | 3/2003 | Melville et al. |
| 6,538,625 B2 | 3/2003 | Tidwell et al. |
| 6,550,918 B1 | 4/2003 | Agostinelli et al. |
| 6,573,952 B1 | 6/2003 | Yamazaki et al. |
| 6,577,411 B1 | 6/2003 | David |
| 6,618,099 B1 | 9/2003 | Spitzer |
| 6,655,820 B2 | 12/2003 | Jung et al. |
| 6,665,031 B2 | 12/2003 | Roest |
| 6,671,100 B1 | 12/2003 | McRuer |
| 6,687,057 B1 | 2/2004 | Yamazaki |
| 6,693,749 B2 * | 2/2004 | King ................. G02B 27/0172 359/485.05 |
| 6,710,927 B2 | 3/2004 | Richards |
| 6,710,928 B2 | 3/2004 | Roest |
| 6,724,353 B2 | 4/2004 | Ophey |

(56) References Cited

U.S. PATENT DOCUMENTS

| | | |
|---|---|---|
| 6,747,611 B1 | 6/2004 | Budd et al. |
| 6,755,532 B1 | 6/2004 | Cobb |
| 6,804,066 B1 | 10/2004 | Ha et al. |
| 6,825,987 B2 | 11/2004 | Repetto et al. |
| 6,847,489 B1 * | 1/2005 | Wu ............... G02B 27/017 349/13 |
| 6,853,356 B2 | 2/2005 | Inoguchi |
| 6,864,861 B2 | 3/2005 | Schehrer et al. |
| 6,871,956 B1 | 3/2005 | Cobb et al. |
| 6,873,471 B2 | 3/2005 | Coates et al. |
| 6,879,443 B2 | 4/2005 | Spitzer et al. |
| 6,891,673 B2 | 5/2005 | Cado et al. |
| 6,972,735 B2 | 12/2005 | Hebert |
| 6,977,776 B2 | 12/2005 | Volkenandt et al. |
| 7,023,621 B2 * | 4/2006 | Dietrich ............... G02B 27/017 359/630 |
| 7,072,096 B2 * | 7/2006 | Holman ............... F21S 8/08 257/E25.02 |
| 7,075,501 B1 | 7/2006 | Spitzer et al. |
| 7,133,207 B2 | 11/2006 | Travers |
| 7,158,096 B1 | 1/2007 | Spitzer |
| 7,165,842 B2 | 1/2007 | Cobb et al. |
| 7,177,083 B2 | 2/2007 | Holler |
| 7,230,766 B2 | 6/2007 | Rogers |
| 7,242,527 B2 | 7/2007 | Spitzer et al. |
| 7,286,287 B1 | 10/2007 | Ofner |
| 7,307,791 B2 | 12/2007 | Li et al. |
| 7,339,742 B2 | 3/2008 | Amitai et al. |
| 7,350,919 B2 | 4/2008 | Hillis et al. |
| 7,355,795 B1 | 4/2008 | Yamazaki et al. |
| 7,397,607 B2 | 7/2008 | Travers |
| 7,436,568 B1 | 10/2008 | Kuykendall, Jr. |
| 7,515,345 B2 | 4/2009 | Heimer |
| 7,525,735 B2 | 4/2009 | Sottilare et al. |
| 7,542,209 B2 | 6/2009 | McGuire, Jr. |
| 7,545,571 B2 | 6/2009 | Garoutte et al. |
| 7,573,640 B2 | 8/2009 | Nivon et al. |
| 7,586,686 B1 | 9/2009 | Hall |
| 7,589,901 B2 | 9/2009 | DeJong et al. |
| 7,595,933 B2 | 9/2009 | Tang |
| 7,637,617 B2 | 12/2009 | Liu et al. |
| 7,639,208 B1 | 12/2009 | Ha et al. |
| 7,639,209 B2 | 12/2009 | Sprague et al. |
| 7,675,684 B1 | 3/2010 | Weissman et al. |
| 7,724,441 B2 | 5/2010 | Amitai |
| 7,724,442 B2 | 5/2010 | Amitai |
| 7,724,443 B2 | 5/2010 | Amitai |
| 7,758,186 B2 | 7/2010 | Rousseau |
| 7,777,819 B2 | 8/2010 | Simmonds |
| 7,798,638 B2 | 9/2010 | Fuziak, Jr. |
| 7,992,996 B2 | 8/2011 | Sugihara et al. |
| 7,997,723 B2 | 8/2011 | Pienimaa et al. |
| 8,000,020 B2 | 8/2011 | Amitai |
| 8,016,421 B2 | 9/2011 | Eberl et al. |
| 8,023,783 B2 | 9/2011 | Mukawa et al. |
| 8,035,872 B2 | 10/2011 | Ouchi |
| 8,042,947 B1 | 10/2011 | Eberl et al. |
| 8,089,568 B1 | 1/2012 | Brown et al. |
| 8,094,377 B2 | 1/2012 | Kessler et al. |
| 8,107,023 B2 | 1/2012 | Simmonds et al. |
| 8,118,427 B2 | 2/2012 | Bonnin et al. |
| 8,125,716 B2 | 2/2012 | Bryant et al. |
| 8,177,361 B2 | 5/2012 | Sessner et al. |
| 8,212,859 B2 | 7/2012 | Tang et al. |
| 8,330,672 B2 | 12/2012 | Moliton |
| 8,369,019 B2 | 2/2013 | Baker et al. |
| 8,382,285 B2 | 2/2013 | Eberl et al. |
| 8,471,967 B2 | 6/2013 | Miao et al. |
| 8,508,830 B1 | 8/2013 | Wang |
| 8,520,310 B2 | 8/2013 | Shimizu |
| 8,537,075 B2 | 9/2013 | Crocco et al. |
| 8,666,212 B1 | 3/2014 | Amirparviz |
| 8,681,184 B2 | 3/2014 | Seesselberg et al. |
| 8,686,923 B2 | 4/2014 | Eberl et al. |
| 8,730,581 B2 | 5/2014 | Schon et al. |
| 8,767,305 B2 | 7/2014 | Spitzer et al. |
| 8,817,379 B2 | 8/2014 | Saeedi et al. |
| 8,848,289 B2 | 9/2014 | Amirparviz et al. |
| 8,873,148 B1 | 10/2014 | Gupta et al. |
| 8,947,627 B2 | 2/2015 | Rappoport et al. |
| 8,953,246 B2 | 2/2015 | Koenig |
| 8,957,835 B2 | 2/2015 | Hoellwarth |
| 8,958,158 B1 | 2/2015 | Raffle et al. |
| 8,964,299 B2 | 2/2015 | Chang |
| 8,970,962 B2 | 3/2015 | Filipovich et al. |
| 8,982,471 B1 | 3/2015 | Starner et al. |
| 9,013,793 B2 | 4/2015 | Gupta et al. |
| 9,019,175 B2 * | 4/2015 | Lu ............... G02B 27/0172 345/8 |
| 9,019,614 B2 | 4/2015 | DeVaul |
| 9,025,253 B2 | 5/2015 | Hadad et al. |
| 9,036,096 B2 | 5/2015 | Lee et al. |
| 9,057,826 B2 | 6/2015 | Gupta et al. |
| 9,063,331 B2 | 6/2015 | Bohn et al. |
| 9,069,115 B2 * | 6/2015 | Gupta ............... G02B 5/02 |
| 9,076,209 B2 | 7/2015 | Choukroun |
| 9,104,036 B2 | 8/2015 | Amitai et al. |
| 9,128,284 B2 | 9/2015 | Cazalet |
| 9,167,235 B2 | 10/2015 | Jacobs et al. |
| 9,170,425 B1 | 10/2015 | Harrison et al. |
| 9,170,766 B2 | 10/2015 | Meier |
| 9,182,596 B2 | 11/2015 | Border et al. |
| 9,201,501 B2 | 12/2015 | Maizels et al. |
| 9,213,178 B1 | 12/2015 | Giri et al. |
| 9,217,868 B2 | 12/2015 | Jacobsen et al. |
| 9,223,147 B2 | 12/2015 | Guillot et al. |
| 9,229,224 B2 | 1/2016 | Mizoguchi et al. |
| 9,239,453 B2 | 1/2016 | Cheng et al. |
| 9,244,277 B2 | 1/2016 | Cheng et al. |
| 9,285,591 B1 | 3/2016 | Gupta et al. |
| 9,310,591 B2 | 4/2016 | Hua et al. |
| 9,323,059 B2 | 4/2016 | Wang et al. |
| 9,348,143 B2 | 5/2016 | Gao et al. |
| 9,348,151 B2 | 5/2016 | Legerton et al. |
| 9,366,867 B2 | 6/2016 | Border et al. |
| 9,377,623 B2 | 6/2016 | Robbins et al. |
| 9,378,431 B2 | 6/2016 | Stoeffer et al. |
| 9,383,582 B2 | 7/2016 | Tang et al. |
| 9,420,186 B2 | 8/2016 | Kikuchi |
| 9,427,154 B2 | 8/2016 | Eberl et al. |
| 9,429,756 B1 | 8/2016 | Cakmakci et al. |
| 9,429,757 B1 | 8/2016 | Peeri |
| 9,429,759 B2 | 8/2016 | Hoellwarth |
| 9,436,275 B2 | 9/2016 | Kimura |
| 9,442,292 B1 | 9/2016 | Gao et al. |
| 9,482,869 B2 | 11/2016 | Hoellwarth |
| 9,543,364 B2 | 1/2017 | Rappoport et al. |
| 9,560,273 B2 | 1/2017 | Meier et al. |
| 9,671,612 B2 * | 6/2017 | Kress ............... G02B 27/0172 |
| 2001/0024177 A1 | 9/2001 | Popovich |
| 2001/0038361 A1 | 11/2001 | Tanijiri et al. |
| 2001/0048561 A1 | 12/2001 | Heacock |
| 2002/0030649 A1 | 3/2002 | Zavracky et al. |
| 2002/0101664 A1 | 8/2002 | King et al. |
| 2002/0191297 A1 | 12/2002 | Gleckman et al. |
| 2003/0030912 A1 | 2/2003 | Gleckman et al. |
| 2003/0042637 A1 | 3/2003 | Foreman et al. |
| 2003/0090439 A1 | 5/2003 | Spitzer et al. |
| 2003/0117342 A1 | 6/2003 | Ebersole, Jr. et al. |
| 2003/0165013 A1 | 9/2003 | Doany et al. |
| 2003/0169491 A1 | 9/2003 | Bender et al. |
| 2003/0218718 A1 | 11/2003 | Moliton et al. |
| 2004/0004767 A1 | 1/2004 | Song |
| 2005/0036109 A1 | 2/2005 | Blum et al. |
| 2005/0180021 A1 | 8/2005 | Travers |
| 2006/0011805 A1 | 1/2006 | Spruck |
| 2006/0132914 A1 | 6/2006 | Weiss et al. |
| 2007/0097277 A1 | 5/2007 | Hong et al. |
| 2007/0177275 A1 | 8/2007 | McGuire, Jr. |
| 2007/0273983 A1 | 11/2007 | Hebert |
| 2008/0088529 A1 | 4/2008 | Tang |
| 2009/0135248 A1 | 5/2009 | Lee et al. |
| 2009/0322972 A1 | 12/2009 | Ando |
| 2010/0033830 A1 | 2/2010 | Yung |

(56) References Cited

U.S. PATENT DOCUMENTS

| | | |
|---|---|---|
| 2010/0157400 A1 | 6/2010 | Dimov et al. |
| 2011/0261275 A1 | 10/2011 | Park |
| 2011/0261316 A1 | 10/2011 | Park |
| 2012/0068913 A1 | 3/2012 | Bar-Zeev et al. |
| 2012/0154920 A1 | 6/2012 | Harrison et al. |
| 2012/0280893 A1 | 11/2012 | Holakovszky |
| 2013/0229712 A1 | 9/2013 | Kress |
| 2013/0242262 A1 | 9/2013 | Lewis |
| 2013/0257689 A1 | 10/2013 | Hotta et al. |
| 2014/0043320 A1 | 2/2014 | Tosaya et al. |
| 2014/0078592 A1 | 3/2014 | Hotta et al. |
| 2014/0098009 A1 | 4/2014 | Prest et al. |
| 2014/0152531 A1 | 6/2014 | Murray et al. |
| 2014/0177063 A1 | 6/2014 | Wang et al. |
| 2014/0213364 A1 | 7/2014 | Tahtouh |
| 2014/0266987 A1 | 9/2014 | Magyari |
| 2014/0340424 A1 | 11/2014 | Ellsworth |
| 2015/0015814 A1 | 1/2015 | Qin |
| 2015/0070773 A1 | 3/2015 | Wang et al. |
| 2015/0091789 A1 | 4/2015 | Alzate |
| 2015/0138184 A1 | 5/2015 | Bilbrey et al. |
| 2015/0168730 A1 | 6/2015 | Ashkenazi et al. |
| 2015/0168731 A1 | 6/2015 | Robbins |
| 2015/0185480 A1 | 7/2015 | Ouderkirk et al. |
| 2015/0192775 A1 | 7/2015 | Suzuki |
| 2015/0198809 A1 | 7/2015 | Wei et al. |
| 2015/0219893 A1 | 8/2015 | Chen et al. |
| 2015/0219899 A1 | 8/2015 | Mack et al. |
| 2015/0234501 A1 | 8/2015 | Lyons |
| 2015/0253575 A1 | 9/2015 | Huang et al. |
| 2015/0260993 A1 | 9/2015 | Bickerstaff et al. |
| 2015/0268476 A1 | 9/2015 | Nonaka et al. |
| 2015/0292874 A1 | 10/2015 | Shpunt et al. |
| 2015/0293357 A1 | 10/2015 | Shin et al. |
| 2015/0301336 A1 | 10/2015 | Denefle et al. |
| 2015/0331246 A1 | 11/2015 | Dewald et al. |
| 2015/0338660 A1 | 11/2015 | Mukawa |
| 2015/0346493 A1 | 12/2015 | Choi et al. |
| 2015/0346506 A1 | 12/2015 | Huang et al. |
| 2015/0362734 A1 | 12/2015 | Moser et al. |
| 2015/0370074 A1 | 12/2015 | McDowall et al. |
| 2016/0004102 A1 | 1/2016 | Nisper et al. |
| 2016/0011425 A1 | 1/2016 | Thurber et al. |
| 2016/0018639 A1 | 1/2016 | Spitzer et al. |
| 2016/0033771 A1 | 2/2016 | Tremblay et al. |
| 2016/0041390 A1 | 2/2016 | Poon et al. |
| 2016/0070104 A1 | 3/2016 | Yang |
| 2016/0103323 A1 | 4/2016 | Du et al. |
| 2016/0109710 A1 | 4/2016 | Smith et al. |
| 2016/0116742 A1 | 4/2016 | Wei |
| 2016/0147067 A1 | 5/2016 | Hua et al. |
| 2016/0156850 A1 | 6/2016 | Werblin et al. |
| 2016/0161769 A1 | 6/2016 | Du et al. |
| 2016/0170283 A1 | 6/2016 | Kim et al. |
| 2016/0178908 A1 | 6/2016 | Dobschal et al. |
| 2016/0178910 A1 | 6/2016 | Giudicelli et al. |
| 2016/0180574 A1 | 6/2016 | Kaminitz et al. |
| 2016/0195725 A1 | 7/2016 | Hsu et al. |
| 2016/0198949 A1 | 7/2016 | Spitzer |
| 2016/0202484 A1 | 7/2016 | Ouderkirk |
| 2016/0209658 A1 | 7/2016 | Zalewski |
| 2016/0216524 A1 | 7/2016 | Deng et al. |
| 2016/0223816 A1 | 8/2016 | Hue et al. |
| 2016/0231577 A1 | 8/2016 | Mack et al. |
| 2016/0238843 A1 | 8/2016 | Dobschal et al. |
| 2016/0238844 A1 | 8/2016 | Dobschal |
| 2016/0252741 A1 | 9/2016 | Hao et al. |
| 2016/0253006 A1 | 9/2016 | Lyons |
| 2016/0266388 A1 | 9/2016 | Dobschal et al. |
| 2016/0266398 A1 | 9/2016 | Poon et al. |
| 2016/0365064 A1 | 12/2016 | Hoellwarth |
| 2017/0212352 A1* | 7/2017 | Cobb ............... G02B 1/18 |
| 2017/0336609 A1* | 11/2017 | Lerner ........... G02B 17/0884 |

FOREIGN PATENT DOCUMENTS

| | | |
|---|---|---|
| CA | 2375519 A1 | 12/2000 |
| CN | 1313958 A | 9/2001 |
| CN | 102200641 A | 9/2011 |
| CN | 102298211 A | 12/2011 |
| CN | 103975267 A | 8/2014 |
| CN | 104126144 A | 10/2014 |
| CN | 104317055 A | 1/2015 |
| CN | 104536130 A | 4/2015 |
| CN | 104570299 A | 4/2015 |
| CN | 104603674 A | 5/2015 |
| CN | 104635333 A | 5/2015 |
| CN | 104656245 A | 5/2015 |
| CN | 104937475 A | 9/2015 |
| CN | 104969114 A | 10/2015 |
| CN | 205139462 U | 4/2016 |
| CN | 105637407 A | 6/2016 |
| CN | 105785571 A | 7/2016 |
| DE | 10335369 A1 | 3/2005 |
| EP | 0395570 A2 | 10/1990 |
| EP | 0681710 A1 | 11/1995 |
| EP | 0718645 A2 | 6/1996 |
| EP | 0763216 A2 | 3/1997 |
| EP | 1000377 A1 | 5/2000 |
| EP | 0834097 B1 | 8/2001 |
| EP | 1259850 A1 | 11/2002 |
| EP | 1771764 A2 | 4/2007 |
| EP | 1196808 A4 | 7/2008 |
| EP | 2064584 A1 | 6/2009 |
| EP | 2639620 A1 | 9/2013 |
| EP | 2770783 A2 | 8/2014 |
| EP | 2985651 A1 | 2/2016 |
| EP | 3125067 A1 | 1/2017 |
| GB | 2295938 A | 12/1996 |
| GB | 2384059 A | 7/2003 |
| GB | 2478358 A | 7/2011 |
| GB | 2516242 A | 1/2015 |
| JP | 2001211403 A | 8/2001 |
| JP | 3678765 B2 | 8/2005 |
| JP | 4194218 B2 | 12/2008 |
| JP | 4387554 B2 | 12/2009 |
| JP | 5031272 B2 | 9/2012 |
| JP | 5373892 82 | 12/2013 |
| KR | 100713024 B1 | 4/2007 |
| KR | 20140016964 A | 2/2014 |
| KR | 101421199 B1 | 7/2014 |
| KR | 20150105420 A | 9/2015 |
| KR | 20160008951 A | 1/2016 |
| KR | 20160002690 U | 8/2016 |
| KR | 20160104662 A | 9/2016 |
| WO | 9104508 A2 | 4/1991 |
| WO | 9524713 A1 | 9/1995 |
| WO | 9601440 A1 | 1/1996 |
| WO | 9725646 A1 | 7/1997 |
| WO | 0052515 A1 | 9/2000 |
| WO | 0181978 A1 | 11/2001 |
| WO | 02054959 A2 | 7/2002 |
| WO | 2005111669 A1 | 11/2005 |
| WO | 2007054928 A1 | 5/2007 |
| WO | 2009131626 A2 | 10/2009 |
| WO | 2009136393 A1 | 11/2009 |
| WO | 2012034291 A1 | 3/2012 |
| WO | 2012160176 A1 | 11/2012 |
| WO | 2013083049 A1 | 6/2013 |
| WO | 2014094581 A1 | 6/2014 |
| WO | 2014097271 A1 | 6/2014 |
| WO | 2014167934 A1 | 10/2014 |
| WO | 2015100714 A1 | 7/2015 |
| WO | 2015150269 A1 | 10/2015 |
| WO | 2015157016 A1 | 10/2015 |
| WO | 2016017085 A1 | 2/2016 |
| WO | 2016025443 A1 | 2/2016 |
| WO | 2016064773 A1 | 4/2016 |
| WO | 2016091743 A1 | 6/2016 |
| WO | 2016101861 A1 | 6/2016 |
| WO | 2016107921 A1 | 7/2016 |

(56) References Cited

FOREIGN PATENT DOCUMENTS

| WO | 2016118178 A1 | 7/2016 |
| WO | 2015050194 A1 | 3/2017 |
| WO | 2015092867 A1 | 3/2017 |

OTHER PUBLICATIONS

Michelle Starr; VrAse Turns Your Smartphone into VR Goggles; internet article; Sep. 3, 2013; 2 pages; CNET Tech Culture; available at www.cnet.com/news/vrase-turns-your-smartphone-into-vr-goggles/.

Ozan Cakmakci and Jannick Rolland; Head-Worn Displays: A Review; Invited Paper; Sep. 2006; 18 pages; vol. 2, No. 3, pp. 199-216; Journal of Display Technology.

International Searching Authority; Invitation to Pay Additional Fees and, Where Applicable, Protest Fee; PCT/US2017/014050; dated Mar. 30, 2017; 8 pages; European Patent Office; Rijswijk, The Netherlands.

* cited by examiner

WIDE FIELD PERSONAL DISPLAY

This is a continuation application of U.S. patent application Ser. No. 15/411,179, filed on Jan. 20, 2017, which in turn claims the benefit of priority to U.S. Provisional Application Ser. Nos. 62/286,019 filed on Jan. 22, 2016, 62/406,674 filed on Oct. 11, 2016, and 62/397,138 filed on Sep. 20, 2016, the contents of which are relied upon and incorporated herein by reference in their entirety.

FIELD OF THE INVENTION

The disclosure relates generally to personal display devices and more particularly to apparatus and methods for a wide-field head-mounted or other single-viewer display having a pupil imaging system.

BACKGROUND

Personal display devices make it possible to provide image content to a viewer in applications where the use of conventional display screens would be an encumbrance. Head-mounted devices (HMDs), such as display goggles, are being considered as a useful type of wearable personal display device usable in a variety of fields, with applications ranging from military, medical, dental, industrial, and game presentation, among others. Stereoscopic imaging, with its enhanced spatial representation and improved presentation of relevant detail, can be particularly useful for presenting images that are more lifelike and that show depth information more accurately than can be possible with 2-dimensional (2-D) flat displays.

Although a number of advances have been made for improving usability, size, cost, and performance of wearable display devices, there remains considerable room for improvement. In particular, imaging optics that present the electronically processed images to the viewer have been disappointing. Conventional design approaches have proved difficult to scale to the demanding size, weight, and placement requirements, often poorly addressing optical problems related to field of view and distortion, eye relief, pupil size, and other factors.

SUMMARY OF THE INVENTION

According to an aspect of the present disclosure, there is provided a display apparatus comprising:
an image generator that generates image-bearing light;
a lens spaced apart from the image generator and having an aspheric incident refractive surface concave to the image generator and having an aspheric reflective surface concave to the image generator, and
a beam splitter plate disposed in free space between the image generator and the lens and having first and second surfaces that are oblique to a line of sight of a viewer,
wherein the lens and the beam splitter plate define a viewer eye box for the image-bearing light along the line of sight of the viewer.

According to some embodiments the image generator generates the image-bearing light from a flat surface such as from a flat display source. According to some embodiments the beam splitter plate has first and second surfaces that are substantially parallel to one another. According to at least some embodiments a principal axis of the reflective surface of the lens is normal to the flat surface of the image generator.

According to an aspect of the present disclosure, there is provided a display apparatus comprising:
an image generator that generates a flat field of image-bearing light from a flat surface;
a lens spaced apart from the image generator and having an aspheric incident refractive surface concave to the image generator and having an aspheric reflective surface concave to the image generator, wherein a principal axis of the reflective surface is normal to the image generator; and
a beam splitter plate disposed in free space between the image generator and the lens and having first and second parallel surfaces that are oblique to a line of sight of a viewer,
wherein the lens and the beam splitter plate define a viewer eye box for the image-bearing light along the line of sight of the viewer.

The display apparatus designs described herein result in increased field of view, reduced image aberration, and large pupil size at low cost compared to other designs, thereby providing personal display device designs that are readily manufacturable and inherently adapted to the human visual system. Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
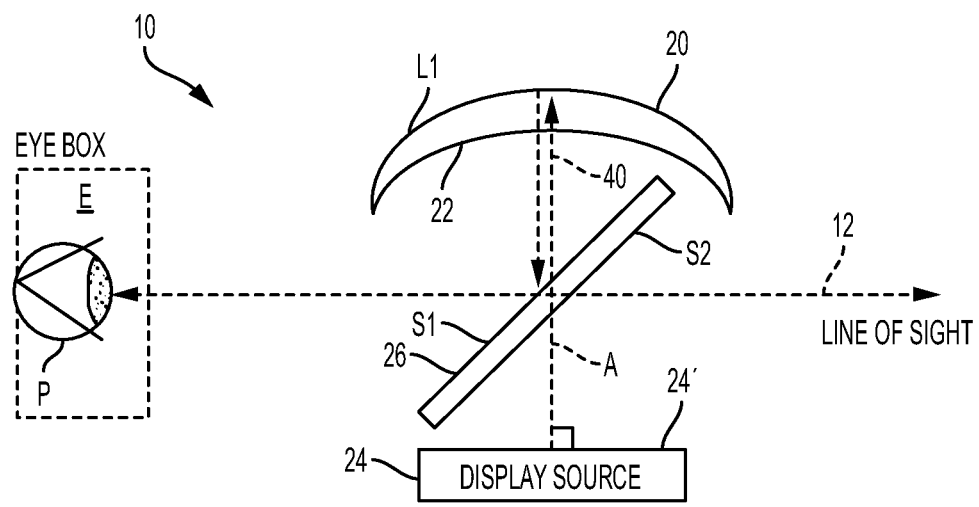
FIG. 1A is a schematic side view that shows optical characteristics and relationships for forming a virtual image to the eye of a viewer.

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or principles of operation.

The figures provided may not show various supporting components, including optical mounts, power sources, image data sources, and related mounting structure for standard features used in a display device. It can be appreciated by those skilled in the optical arts that embodiments of the present invention can use any of a number of types of standard mounts and support components, including those used with both wearable and hand-held display apparatus.

In the context of the present disclosure, terms such as "top" and "bottom" or "above" and "below" or "beneath" are relative and do not indicate any necessary orientation of a component or surface, but are used simply to refer to and distinguish views, opposite surfaces, spatial relationships, or different light paths within a component or apparatus. Similarly, terms "horizontal" and "vertical" may be used relative to the figures, to describe the relative orthogonal relationship of components or light in different planes relative to standard viewing conditions, for example, but do not indicate any required orientation of components with respect to true horizontal and vertical orientation.

Where they are used, the terms "first", "second", "third", and so on, do not necessarily denote any ordinal or priority relation, but are used for more clearly distinguishing one element or time interval from another. These descriptors are used to clearly distinguish one element from another similar element in the context of the present disclosure and claims.

The terms "viewer", "observer", and "user" can be used interchangeably in the context of the present disclosure to indicate the person viewing an image from a personal display apparatus.

As used herein, the term "energizable" relates to a device or set of components that perform an indicated function upon receiving power and, optionally, upon receiving one or more enabling signals. For example, a light source is energizable to emit a beam of light and can be modulated for image presentation according to image data signals.

In the context of the present disclosure, two planes, direction vectors, or other geometric features are considered to be substantially orthogonal when their actual or projected angle of intersection is within +/−4 degrees of 90 degrees.

In the context of the present disclosure, the term "oblique" or phrase "oblique angle" is used to mean a non-normal angle that is slanted so that it differs from normal, that is, differs from 90 degrees or from an integer multiple of 90 degrees, by at least about 4 degrees or more along at least one axis. For example, an oblique angle may be at least about 4 degrees greater than or less than 90 degrees using this general definition.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the term "left eye image" describes a virtual image that is viewed by the left eye of the viewer and a "right eye image" describes a corresponding virtual image that is viewed by the right eye of the viewer. The phrases "left eye" and "right eye" may be used as adjectives to distinguish imaging components for forming each image of a stereoscopic image pair, as the concept is widely understood by those skilled in the stereoscopic imaging arts.

The term "at least one of" is used to mean one or more of the listed items can be selected. The term "about" or "approximately", when used with reference to a dimensional measurement or position, means within expected tolerances for measurement error and inaccuracy that are accepted in practice. The expressed value listed can be somewhat altered from the nominal value, as long as the deviation from the nominal value does not result in failure of the process or structure to conform to requirements for the illustrated embodiment.

With relation to dimensions, the term "substantially" means within better than +/−12% of a geometrically exact dimension. Thus, for example, a first dimensional value is substantially half of a second value if it is in the range of from about 44% to about 56% of the second value. Positions in space are "near" each other or in close proximity when, relative to an appropriate reference dimension such as a radius of curvature, a focal point, a component location, or other point on an optical axis, distance dimensions are substantially the same, no more than about 12% apart, preferably within 5% or 1% or less distance from each other.

The term "actuable" has its conventional meaning, relating to a device or component that is capable of effecting an action in response to a stimulus, such as in response to an electrical signal, for example.

The term "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

The term "exemplary" indicates that the description is used as an example, rather than implying that it is an ideal.

With respect to positions of components or centers of curvature or other features of an optical apparatus, the term "near" has its standard connotation as would be used by one skilled in the optical design arts, with consideration for expected manufacturing tolerances and for measurement inaccuracies, for example, as well as for expected differences between theoretical and actual behavior of light.

As is well known, the light distribution within and from a specific optical system depends on its overall configuration, which need not be geometrically perfect or exhibit ideal symmetry for suitable performance. For example, the light distribution for a curved mirror can more accurately described as focused on a small region that is substantially centered about a focal point; however, for the purposes of description, the conventional terms such as "focal point" or "focal region" are used. The term "eye box" denotes a region from which a virtual image formed by an optical system can be viewed.

When a scene is viewed from a single position and is presented to the observer at both eye positions the view lacks the perception of depth, the third dimensional effect. A scene viewed in this way is called bi-ocular. However, when a single scene is viewed from two positions spaced even slightly from one another, the view presented to the observer has the sense of depth. A scene viewed in this way is called binocular. A scene viewed from one eye position and produced from one position is called monocular and lacks the third dimensional effect.

As is well known to those skilled in the imaging arts, a virtual image is synthetically simulated by divergence of light rays provided to the eye from an optical system and viewed in space at an eye box. An optical system forms a virtual image that appears in the field of view of a viewer at a given position and distance. There is no corresponding "real" object in the field of view from which the rays actually diverge. So-called "augmented reality" viewing systems employ a virtual imaging system to provide superposition of the virtual image onto the real-world object scene that is viewed along a line of sight of the viewer. This capability for forming a virtual image that can be combined with object scene image content in the viewer's field of view distinguishes augmented reality imaging devices from other display devices that provide only a real image to the viewer.

Referring to the schematic diagram of FIG. 1A, there is shown, in side view representation, a virtual image forming apparatus 10 that forms a virtual image for view by an eye pupil P in an eye box E. A beam splitter plate 26 (alternately termed a plate beamsplitter, beamsplitter, or beam splitter) having first and second parallel surfaces S1 and S2 is obliquely disposed along a viewer line of sight 12 and is spaced apart from, and disposed in free space between, an image generator 24 for providing an image, and a lens L1. In the embodiment illustrated, image generator 24 is a display source having a display surface 24' for providing an image. In some embodiments, as shown in FIG. 1, the surface 24' of the image generator is flat and thus generates a flat field of image bearing light. For example, the display surface may be a flat display surface of a cell phone or a "smart phone". However, in other embodiments the display surface 24' of the image generator 24 may be slightly curved.

FIG. 1A illustrates that in this embodiment lens L1 is a modified meniscus. More specifically, lens L1 has a refractive aspheric surface 22 that is concave with respect to image generator 24 and a reflective aspheric surface 20 that is also concave with respect to image generator 24. In FIG. 1A embodiment, lens L1 may be a catadioptric optical element—i.e., a meniscus lens with a reflective surface on the rear side of the element forming a curved mirror that reflects light back toward the image generator 24 without spherical aberration in a flat image field (i.e., flat image surface across the field of view). A principal axis A of the reflective aspheric surface 20 is normal to image generator 24. Image generator 24 is energizable to direct a flat field of image-bearing light toward spaced-apart surface S2 of beam splitter plate 26. Image generator 24, beam splitter plate 26, and lens L1 cooperate and are structured to form a virtual image that is viewable along line of sight 12 at eye box E. In some embodiments the image generator 24 may be situated above the viewer's eye, and the lens is situated below viewer's eyes. In some embodiments the image generator 24 may be situated below the viewer's eye, and the lens L1 is situated above viewer's eyes.

Beam splitter plate 26 and lens L1 define, for an image for a single eye, an optical path 40 along which the light from beam splitter plate 26 is conveyed through free space for a first refraction in a first direction through aspheric incident refractive surface 22. The refracted light is reflected from aspheric reflective surface 20 and then continues back along optical path 40, where the reflected light is refracted a second time from aspheric incident refractive surface 22. The light then travels through free space and back to beam splitter plate 26 that reflects the light from the lens L1 along an uninterrupted path toward the viewer eye box E along line of sight 12 of a viewer, wherein line of sight 12 for the object scene extends through beam splitter plate 26. Beam splitter plate 26 provides a slanted window through which the object scene is viewable. Thus the beam splitter is structured and positioned such that the image bearing light generated by the image generator traverses the beam splitter as it propagates toward the lens, and is reflected from the beam splitter after it is reflected by the lens. According to some embodiments beam splitter plate 26 weighs less than 25 grams (e.g., <20 grams, <15 grams, <10 grams) and provides a horizontal full field of view that is at least 30 degrees, and in some embodiments exceeds 40 degrees (e.g., 40-70 degrees, for example 50-60 degrees). In some embodiments the beam splitter plate 26 weighs 2-10 grams, for example no more than 5 grams, and in some embodiments 2 to 5 grams. According to some embodiments the beam splitter plate 26 has a partially reflecting surface, the partially reflecting surface is positioned to face the lens L1, L2. In the exemplary embodiments described herein the partially reflective surface reflects at least 25% of the light (e.g., 25% to 75%, or 30% to 70%, or 40 to 60% or 45 to 65%) in the visible spectrum transmits, and transmits at least 25% of the light (e.g., 25% to 75%, or 30% to 70%, or 40 to 60% or 45 to 65%) in the visible spectrum transmits. For example, the partially reflective surface my: (i) transmit 45% of light and reflect 55% of light, or (ii) may transmit 50% of light through, and reflect 50% of light back, or (ii) may transmit 55% of light and reflect 45% of light in the visible spectrum.

It is noted that if the imaging optical element was simply a spherical mirror, instead of lens L1 (with a refractive surface facing the image generator 24 and a reflective back surface), the resultant field would be very out of focus. This defocusing can be addressed by significantly reducing the field of view. However, as shown by the embodiments described herein by having an optical component L1, L2 that has a refractive as well as a reflective lens surface (which are, in this embodiment both aspheric) we can correct the image aberrations (across the pupil and the field) and obtain a well focused image even when the field of view exceeds 40 degrees. Because the light from the image generator 24 passes through the refractive surface 22 twice, lens L1 provides an equivalent of three aspheric surfaces, enabling correction of several optical aberrations over a wide field of view that exceeds 40 degrees via a simply, single, compact, light weight element. In some embodiments, one or more of the aspheric surfaces can have different factors such as radii of curvature, conic constants or other factors (e.g., A, B and C aspheric coefficients which will be described further below) that define the optical properties of the aspheric surfaces. In some embodiments, all aspheric surfaces may have such differing radii of curvature and/or other factors.

As referred to herein "flat image field" refers to the flat image plane across the field of view". As referred to herein, a "flat field of image" and "flat field of image-bearing light" generated by the image generator 24, refers to a flat display surface 24' or the light emanating from this surface across the (object) field of view displayed by the source 24.

According to an embodiment of the present disclosure, lens L1 is designed to provide correction for field curvature of the virtual image. In another embodiment, an alternate approach to compensate field curvature is use of a field lens placed in proximity to the image generator 24; however, the use of a monolithic lens at the reflective surface along optical path 40 can provide the same function and is advantaged for simplicity, reducing optical placement requirements and allowing any of a number of types of display to be used, including displays that can differ in size and aspect ratio, for example.

Image distortion could alternately be corrected using one or more additional lenses L1', L2' (not shown) in the optical system. However, distortion can also be digitally corrected in a straightforward manner, by appropriate adjustment to the image data.

Figure 2:
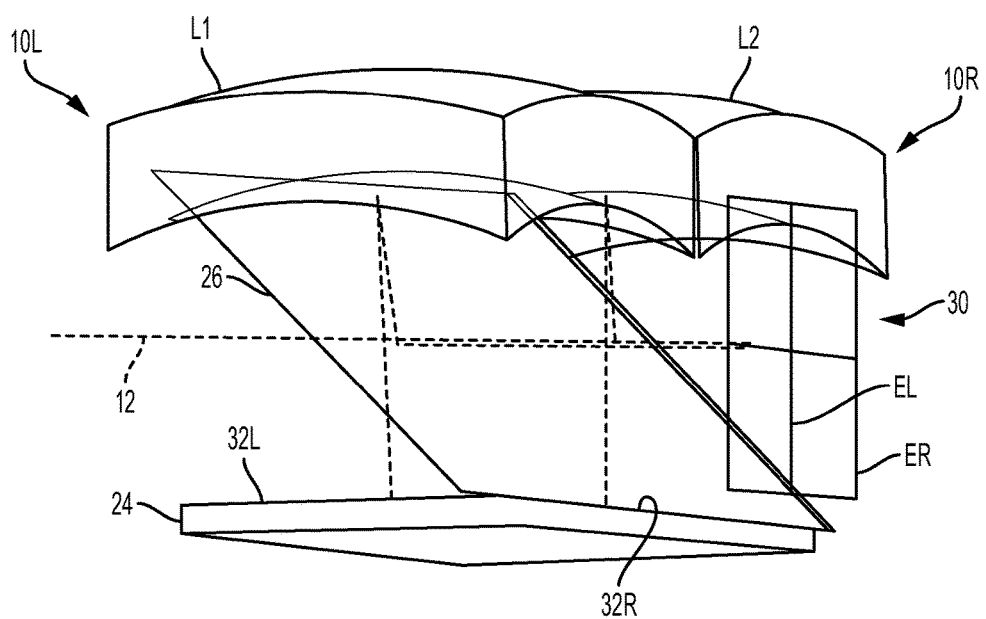
FIG. 2 is a perspective view showing a display apparatus for forming a binocular or stereoscopic image at a viewer eye box.

FIG. 1A showed the arrangement of components of virtual image forming apparatus 10 for forming a single left-eye or right-eye image. The schematic diagram of FIG. 2 shows how a display apparatus 30 forms a binocular virtual image, with left-eye and right-eye images viewable at respective eye boxes EL and ER using a single beam splitter plate 26. A single image generator 24 generates real left-eye and right-eye images, 32L and 32R, respectively. A flat field of image-bearing light from left-eye image 32L transmits through beam splitter plate 26 and to lens L1. With this arrangement, image generator 24 and lens L1 form a left-eye virtual image forming apparatus 10L in cooperation with beam splitter plate 26. Similarly, light from right-eye image 32R transmits through beam splitter plate 26 and to lens L2. Image generator 24 and lens L2 form a right-eye virtual image forming apparatus 10R with beam splitter plate 26. The use of a single beam splitter plate 26 and lenses L1, L2 for defining eye box positions for both left- and right-eye virtual images is advantageous for reducing parts count and simplifying component mounting. The arrangement of FIG. 2 is capable of providing stereoscopic viewing when provided with appropriate left- and right-eye image content. The image content can be stereoscopic or can alternately be non-stereoscopic. In addition, a field lens can be added, for example in between the image generator and the beam splitter plate 26 to further correct for aberrations. For example, the field lens may be situated adjacent to the image generator.

Figure 1B:
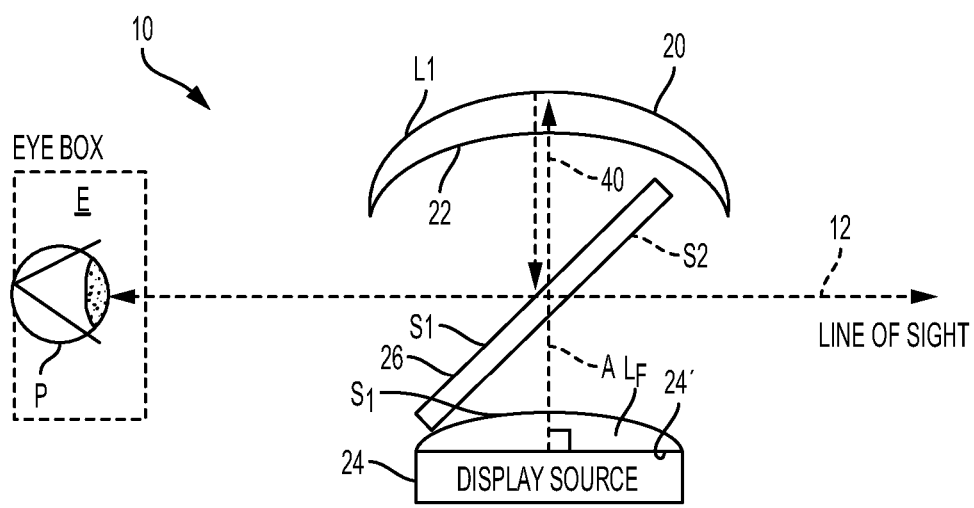
FIG. 1B is a schematic side view of another embodiment that shows optical characteristics and relationships for forming a virtual image to the eye of a viewer.

In some embodiments (see for example FIG. 1B) only one surface of Lens L1, L2 (i e., either the reflective or the refractive surface of the lens L1, L2 is aspheric. The embodiment of FIG. 1B is similar to the embodiment shown in FIG. 1, but further includes a field lens $L_F$ situated adjacent to or in contact with the image generator. In the embodiment of FIG. 1B the field lens $L_F$ has at least one aspheric surface, for example surface $S_1$.

The design of display apparatus 30 in FIG. 2 can scale with the focal length of each respective lens L1 and L2. FIGS. 3A through 5D show different exemplary arrangements possible with different focal lengths, allowing longer or shorter eye relief based on focal length. In addition, the vertical spacing of display apparatus 30 components can be more or less compact, making the display apparatus scalable for a variety of wearable and head-mounted configurations, as well as hand-held configurations, or for stationary configurations in which the display apparatus 30 is mounted to other equipment.

Figure 3A:
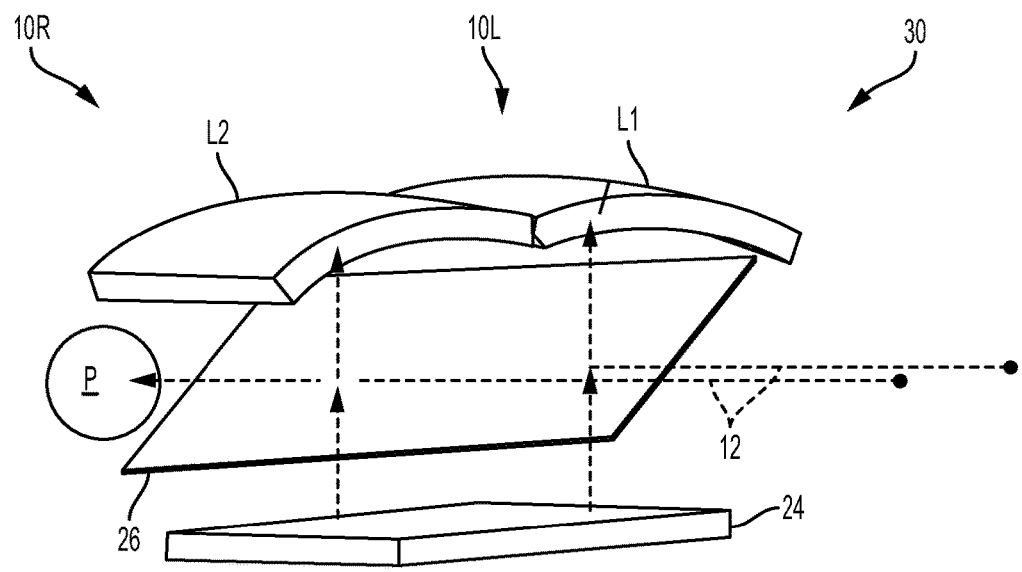
FIGS. 3A, 3B, and 3C are perspective, side, and front views, respectively, of an embodiment of the display apparatus.
Figure 3B:
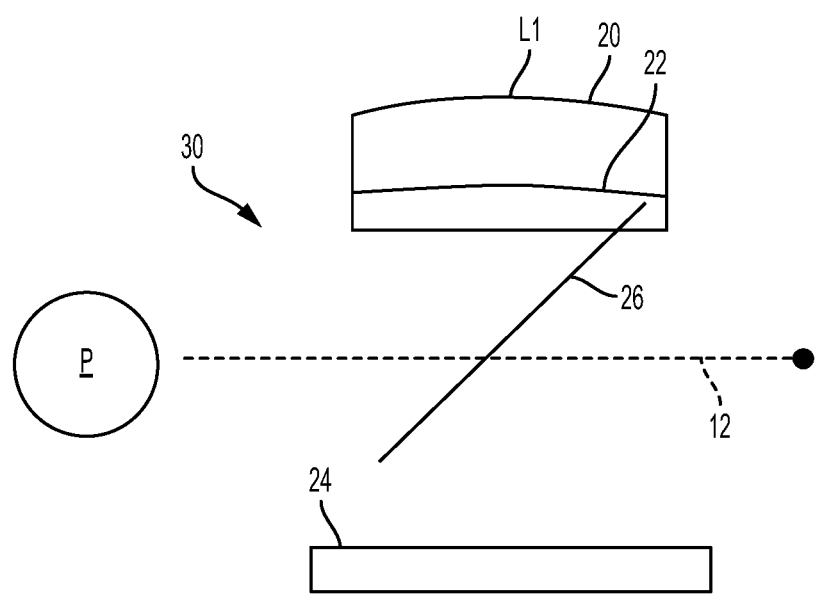
Figure 3C:
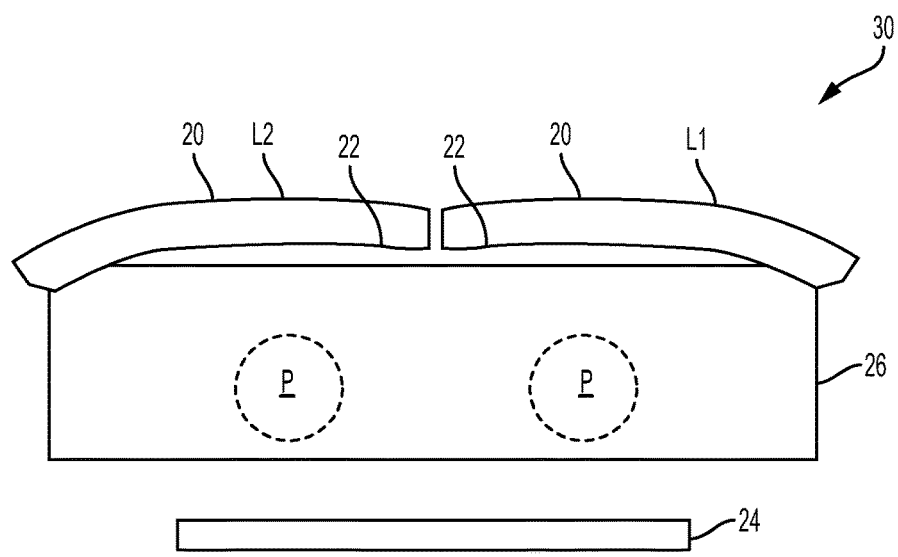

FIG. 3A shows a perspective view from the front of a configuration of display apparatus 30 with a single image generator 24 for providing left-eye and right-eye image content, from different portions of the display surface, to respective pupils P (viewer's eye pupils) at each corresponding eye box. FIG. 3B shows a side view of the FIG. 3A configuration. FIG. 3C shows a front view of the FIG. 3A configuration. As shown in the front plan view of FIG. 3C each eye's field of view may be horizontally non-symmetric. That is, the field of view to the outside of the eye, the peripheral field extending horizontally to the right and left, may be larger than the field of view to the inside of the eye.

In FIG. 3A and subsequent embodiments, there is a corresponding left or right line of sight 12 for the corresponding left or right eye.

Figure 4A:
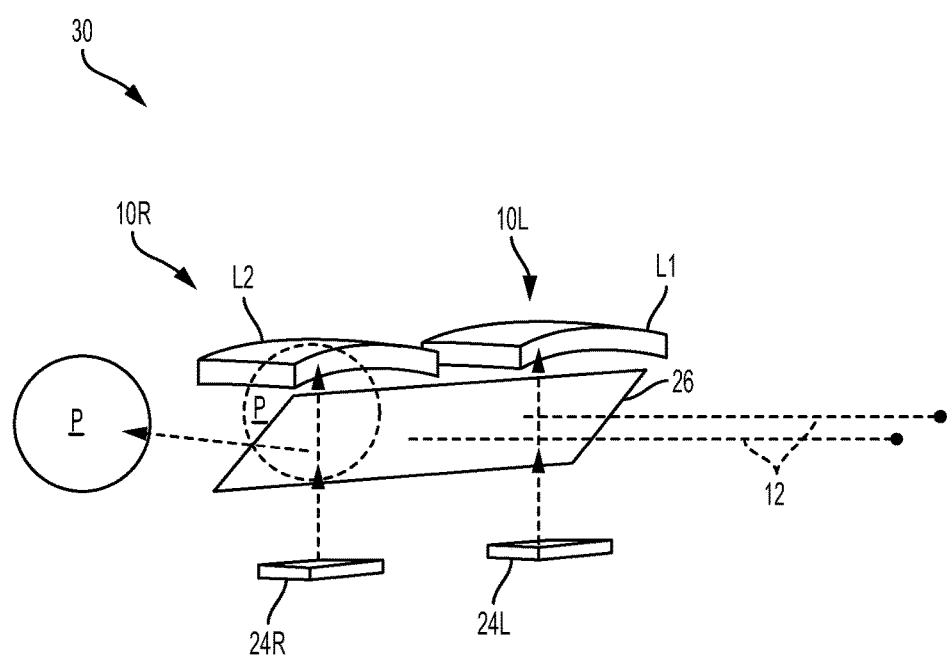
FIGS. 4A, 4B, and 4C are perspective, side, and front views, respectively, of an alternate embodiment of the display apparatus.
Figure 4B:
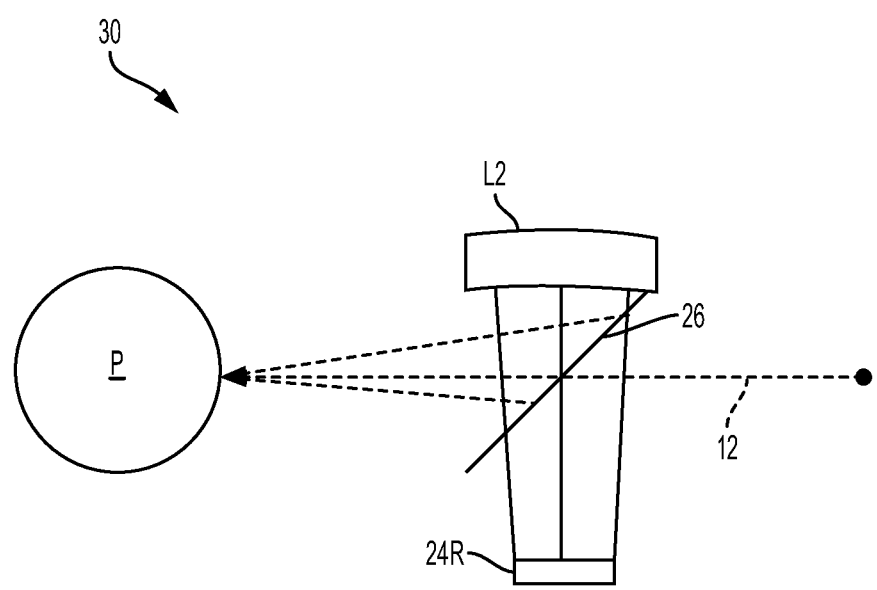
Figure 4C:
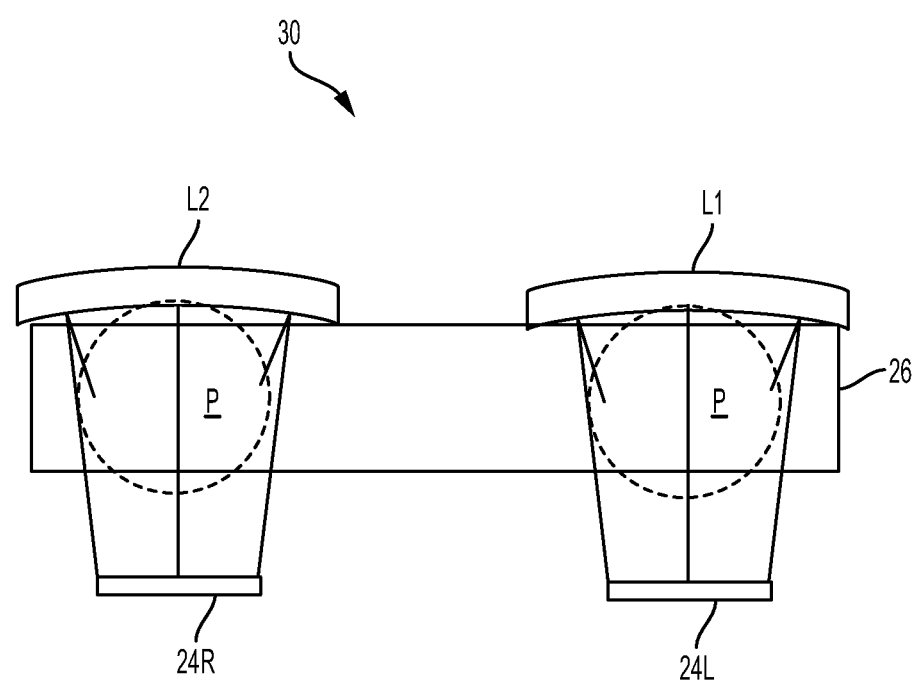

FIG. 4A shows a perspective view, FIG. 4B a side view, and FIG. 4C a front plan view of an embodiment that uses separate left- and right-eye image generators, 24L and 24R, respectively. Image generators 24L and 24R and/or display surfaces 24L', 24R' can lie in the same plane or may be offset from each other, tilted or adjusted for improved packaging or to adjust for viewer anatomy, for example.

Figure 5A:
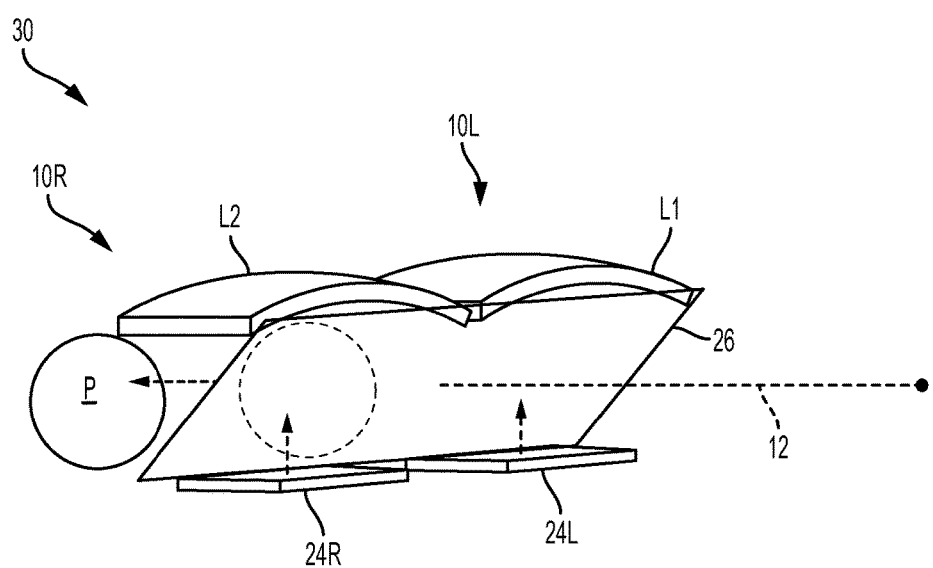
FIGS. 5A, 5B, and 5C are perspective, side, and front views, respectively, of another alternate embodiment of the display apparatus.
Figure 5B:
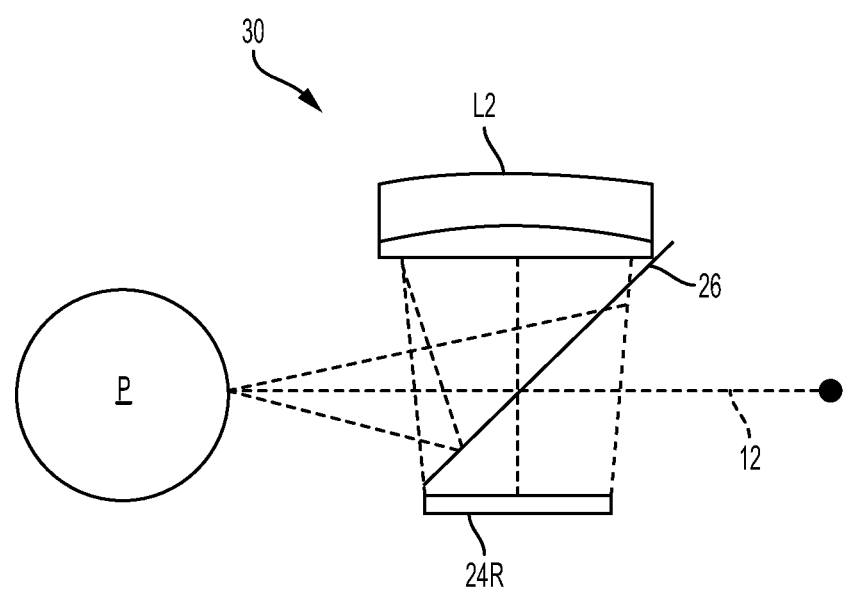
Figure 5C:
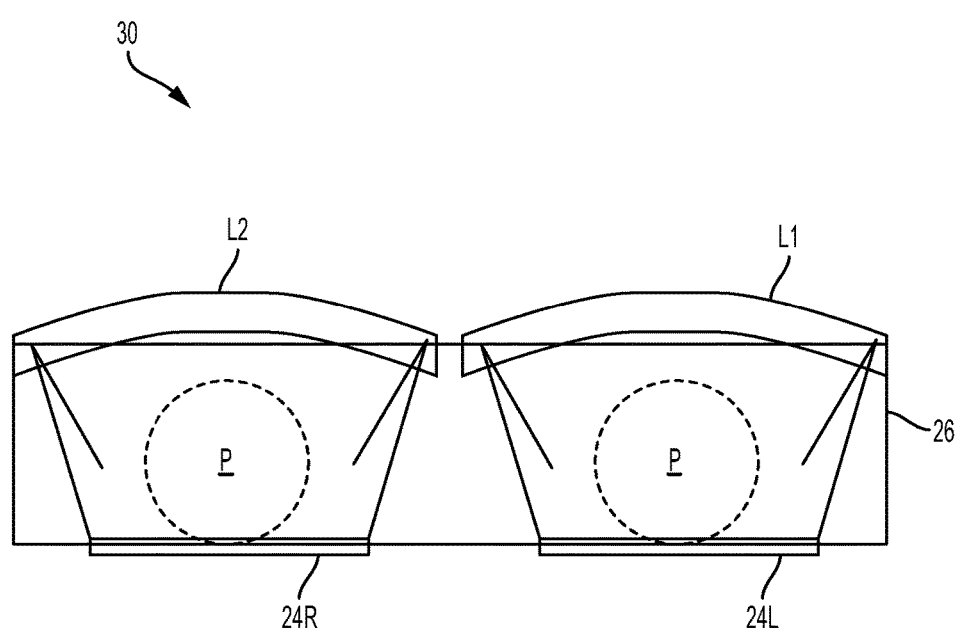

FIG. 5A shows a perspective view, FIG. 5B a side view, and FIG. 5C a front view of an alternate embodiment that uses a single beam splitter plate 26 with separate left- and right-eye image generators, 24L and 24R, respectively.

Figure 5D:
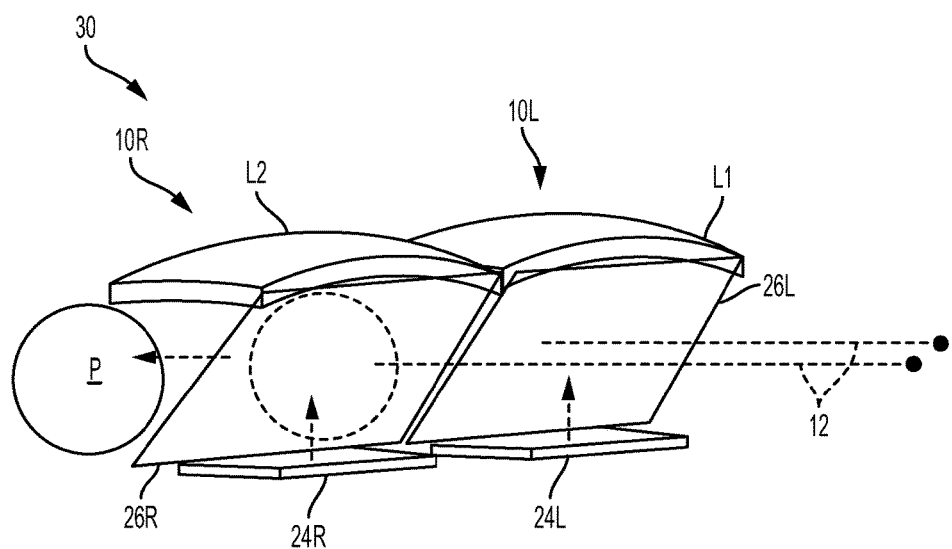
FIG. 5D is a perspective view that shows an alternate embodiment wherein a separate beam splitter plate is used for each of a left-eye and a right-eye virtual image forming apparatus.

FIG. 5D is a perspective view that shows an alternate embodiment wherein a separate beam splitter plate 26L is used for a left-eye virtual image forming apparatus 10L; beam splitter plate 26R is used in the right-eye virtual image forming apparatus 10R. Each beam splitter plate 26L, 26R lies along the corresponding left or right line of sight 12 for the corresponding left or right eye.

Figure 5E:
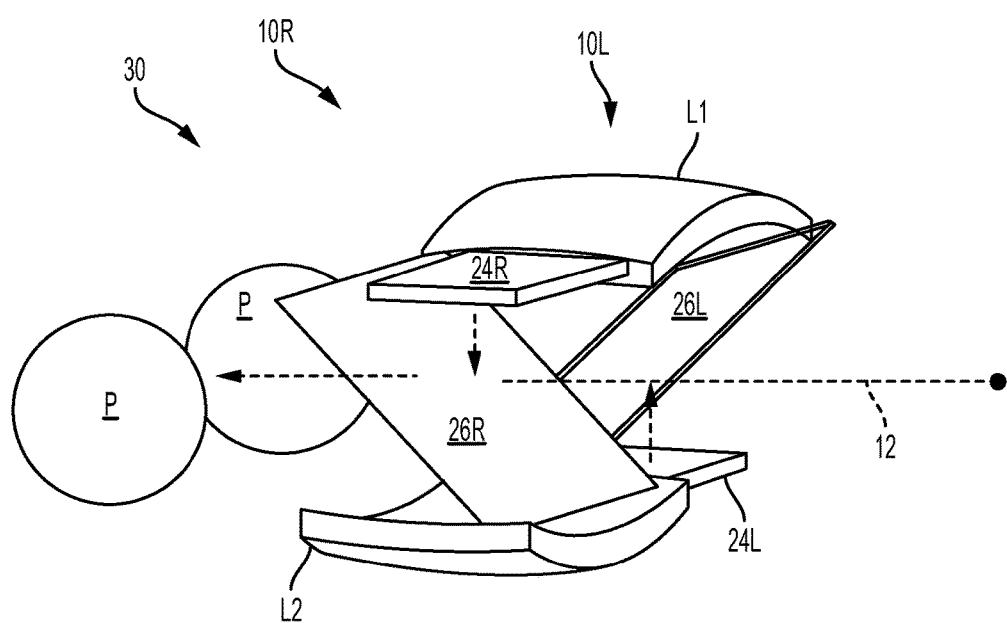
FIG. 5E is a perspective view that shows an alternate embodiment with beam splitter plates disposed at opposite oblique angles.

The perspective view of FIG. 5E shows an alternate embodiment using individual beam splitter plates 26L and 26R for the left- and right-eye virtual image forming apparatus. Left and right beam splitter plates 26L and 26R are disposed at opposite oblique angles relative to line of sight 12. The positions of image generators 24L and 24R and of lenses L1 and L2 are also reversed between the virtual image forming apparatus 10L and 10R. The left-eye and right-eye image generators 24L and 24R, respectively, direct image-bearing light in opposite directions. This alternate arrangement may be useful, for example, for providing more compact packaging.

The embodiments of FIGS. 5A-5E may be utilized, for example, with OLED based image generation devices. In one embodiment, such OLED based image generation devices have pixels that are less than or equal to 44 microns× 44 microns, 40 microns×40 microns, 30 microns×30 microns, 24 microns×24 microns, 20 microns×20 microns, or the image generation devices device may even have even smaller sized pixels. Other image generation devices may also be utilized.

According to some embodiments the display apparatus comprises an optical system. The optical system comprises: (i) an image generator that generates an image-bearing light from an image generator display surface; (ii) at least two lenses spaced apart from the image generator, each of the two lenses having an incident refractive surface concave to the image generator and having a reflective surface concave to the image generator, and at least one of the reflective or refractive surfaces being an aspheric surface; and (iii) a beam splitter plate disposed in free space between the image generator and the lens and having first and second surfaces that are oblique to a line of sight of a viewer, wherein the lens and the beam splitter plate define a viewer eye box for the image-bearing light along the line of sight of the viewer.

The display designs disclosed herein may result in an eye relief distance (i.e. the horizontal distance between the eye pupil and the closest edge of the beam splitter) between 8 mm and 40 mm (e.g., 10 mm to 30 mm), a horizontal FOV between 30 and 70 degrees (e.g., 40 to 70 degrees) and resolution between 1 min per pixel and 4 min/pixel. A resolution of about 1 min/per pixel can be achieved, for example, if one uses a an image generator such as an OLED display with 20×20 μm pixels. According to some embodiments, the reflective and refractive surfaces of lenses L1 and L2 are structured such that said optical axes of the lenses are parallel to each other within 1 minute of arc and spaced by each other by a distance between 50 mm and 80 mm (e.g., 60-70 mm). The optical system of the display apparatus further comprises an exit pupil having an exit pupil diameter $Dp \geq 7$ mm, for example 7 mm $\leq Dp \leq 20$ mm (e.g., 8 mm, 10 mm, 12 mm, 15 mm, 18 mm, 20 mm, or therebetween).

According to some embodiments the optical system further comprises an exit pupil with exit pupil diameter $Dp \geq 7$ mm and also has a vertical full field of view FOVv and a horizontal full field of view FOVh such that the ratio of the horizontal field of view to the vertical field of view is FOVh/FOVv>1.5. In some embodiments FOVh/FOVv>1.7, for example 3≥FOVh/FOVv>1.7.

According to some embodiments the distance between the image generator 24 and the lens L1, L2 is 20-60 mm, for example 30-50 mm.

According to some embodiments the display apparatus comprises:
(i) an image generator that generates an image-bearing light from an image generator display surface; (ii) a lens spaced apart from the image generator, the lens having an incident refractive surface concave to the image generator and having a reflective surface concave to the image generator, and at least one of said surfaces is aspheric; and (iii) a beam splitter plate disposed in free space between the image generator and the lens and having first and second surfaces that are oblique to a line of sight of a viewer, wherein the lens and the beam splitter plate define a viewer eye box for the image-bearing light along the line of sight of the viewer, and wherein the display apparatus exhibits at least one of: (a) horizontal field of view between 30 and 70 degrees, an eye relief distance between 5 mm and 50 mm, focal length of the lens between 30 mm and 70 mm; an exit pupil diameter between 7 mm and 20 mm, and a distance between the lens and the display of 30 mm to 70 mm; or (b) an eye relief distance between 5 mm and 40 mm, a horizontal FOV between 30 and 70 degrees and resolution between 1 min/pixel and 4 min/pixel. According to some embodiments the display apparatus exhibits lateral chromatic aberration that is less than 44 micrometers. (Lateral color is a variation of magnification with color (red, green, and blue (R,G,B)). According to some embodiments the display apparatus exhibits lateral chromatic aberration that is less than the size of a pixel—i.e., so that R, G, and B rays fall within the same pixel. According to some embodiments the display apparatus exhibits lateral chromatic aberration that is not greater than pixel size of the image generator.

The table (Table 1) that follows lists various performance characteristics of the several exemplary embodiments shown in FIGS. 3A-5C.

TABLE 1

Performance for Typical Embodiments

| | For apparatus shown in FIGS. | FOV degrees (H × W) | Eye relief | Effective Focal Length (EFL) | Beam splitter plate size | Angular resolution (note 1) |
| --- | --- | --- | --- | --- | --- | --- |
| Embodiment 1 | 3A-3C | 60 × 28 | 30 mm | 64.7 mm | 60 × 170 mm | 2.3 min/pixel |
| Embodiment 2 | 4A-4C | 30 × 17.5 | 28 mm | 38 mm | 25 × 100 mm | 4 min/pixel |
| Embodiment 3 | 5A-5C | 60 × 28 | 16 mm | 38 mm | 40 × 125 mm | 4 min/pixel |
| Embodiment 4 | 3A-3C | 60 × 28 | 30 mm | 64.7 mm | 60 × 170 mm | 1.1 min/pixel |
| Embodiment 4 | 4A-4C | 30 × 17.5 | 28 mm | 38 mm | 25 × 100 mm | 2 min/pixel |
| Embodiment 6 | 5A-5C | 60 × 28 | 16 mm | 38 mm | 40 × 125 mm | 2 min/pixel |
| Embodiment 7 | 5A-5C | 60 × 28 | 8.4 mm | 20 mm | | 3.8 min/pixel |

(note 1):
- Angular resolution values of the first three embodiments of Table 1 are based on commercially available smartphone having a 0.044 mm display pixel. Angular resolution values of the embodiments 4-7 of Table 1 are based on displays with pixel sizes of 0.02 mm (e.g., OLED displays).

It should be noted that the field of view of the viewer for the object scene (that is, for real objects in the field of view of the viewer) is larger than the field of view within which the virtual image is formed. The optical arrangement of the disclosed embodiments provides a large field of view (FOV) for an augmented reality display.

Advantageously, the beam splitter plate is lightweight. According to an exemplary embodiment, a beam splitter plate suitable for a greater than 40 degree horizontal FOV, such as an 80×150 mm beam splitter plate, weighs less than 25 grams. The optical thickness between surfaces of the beam splitter plate is less than 3 mm (e.g., 0.5 mm, 1 mm, 1.5 mm, 2 mm or therebetween).

By comparison, other proposed augmented reality display designs use prisms. A prism-based optical system, however, requires a correspondingly large prism in order to provide a large FOV, making it difficult to scale prism-based designs to large FOV application. A head-mounted apparatus using a single beamsplitter prism for a nominal 40 degree horizontal FOV for both eyes must support prism weight that is well in excess of 700 grams. The added weight of a large prism effectively constrains the available FOV, as well as adding considerable bulk and weight.

Figure 6A:
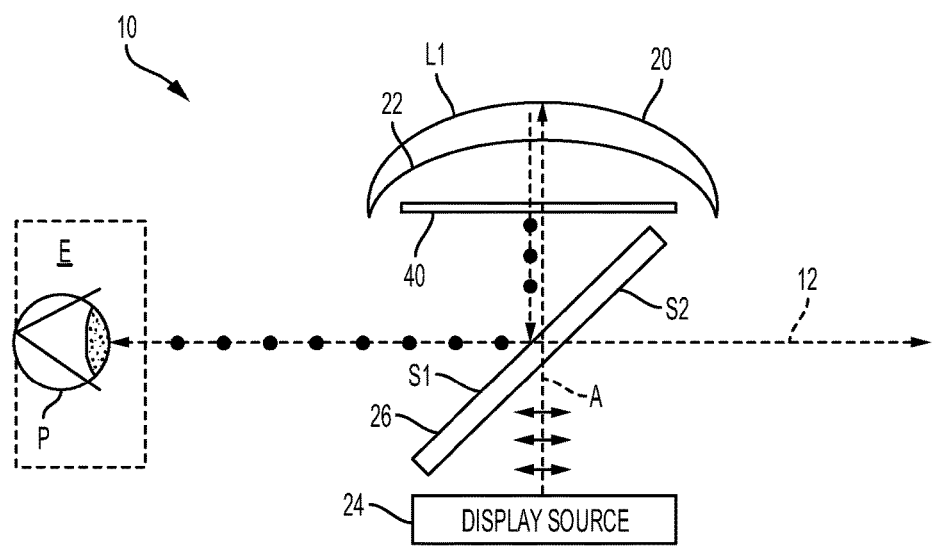
FIG. 6A is a schematic side view of an alternate embodiment that uses polarization for directing light at the beam splitter plate.
Figure 6B:
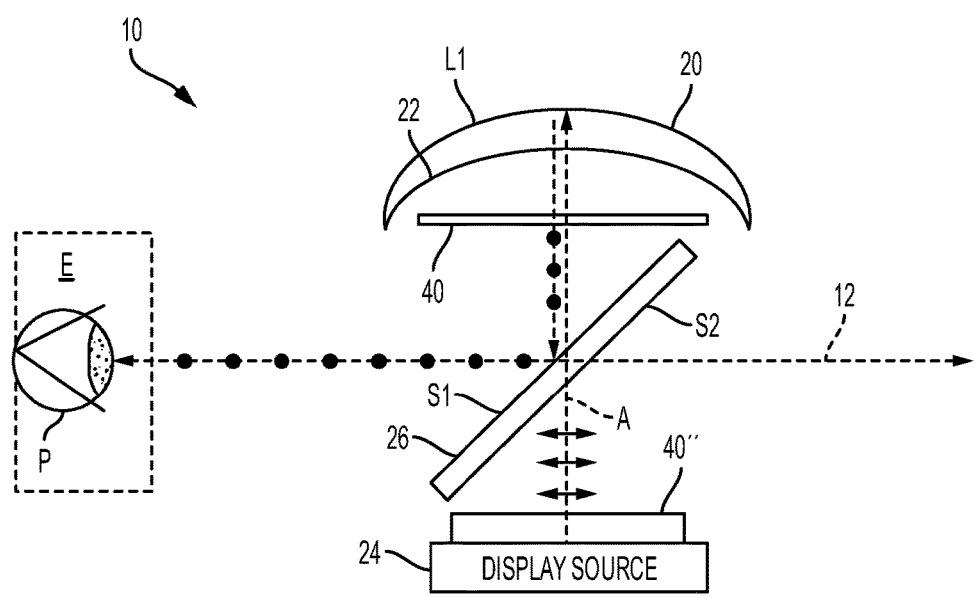
FIG. 6B is a schematic side view of an alternate embodiment that uses polarization for directing light at the beam splitter plate.

The schematic side view of FIG. 6 shows an alternate embodiment that uses
polarization for directing light at beam splitter plate 26. Image generator 24 provides image content as polarized light having a first polarization state (for example, p-polarization). Beam splitter plate 26, configured as a polarization beam splitter, transmits the first state (p-polarization, shown by arrows) and reflects the orthogonal state (s-polarization, shown by dots). Two transits (passes) through a quarter wave plate 40' transform the first (p-) polarization state into the orthogonal (s-) polarization state for reflection from beam splitter plate 26. The wave plate 40' may be a quarter wave retarder (also referred to herein ¼ wave plate). The wave plate 40' may be an achromatic ¼ wave plate. Preferably the wave plate 40' is achromatic across the visible spectrum. In the embodiment of FIG. 6A the wave plate 40' is situated between the lens L1 and the beam splitter plate 26. FIG. 6B is similar to FIG. 6A but also illustrates that this embodiment utilizes a polarizing plate 40" situated next to the image generator 24. The polarizing plate 40" functions to polarize the light from the image generator 24 and is achromatic across the visible spectrum.

Figure 7:
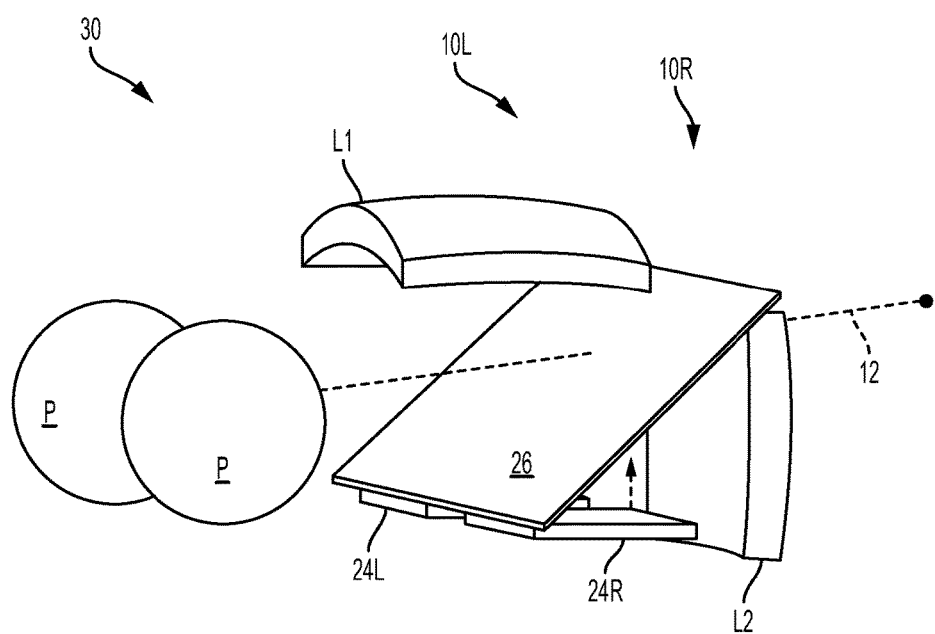
FIG. 7 is a perspective view of an alternate embodiment in which part of the field of view is blocked.

The perspective view of FIG. 7 shows an alternate embodiment that allows limited visibility of the object scene. Lens L2 for the right virtual image forming apparatus 10R is disposed to partially block line of sight 12; Lens L1 for the left virtual image forming apparatus 10L has the same position shown in other figures, allowing visibility of the object scene through beam splitter plate 26.

For full virtual-reality viewing, both lenses L1 and L2 can be disposed so that they block line of sight 12.

Image Generator

As used herein, image generator 24 can be any source that can emit image-bearing light for forming images for one or both eyes of the viewer, including a hand-held personal communications device, smartphone, pad, computer screen, or other display source or image projection source. In some embodiments the image generator is capable of emitting a flat image-bearing light, that is, the image is not a curved image being transmitted. Image generator devices that can be used can include flat-panel personal communications devices such as cellular phones, so-called "smartphones" that provide some type of mobile operating system, feature phones having at least some measure of computing and display capability, "smart watches", and various types of electronic pads, computerized tablets, and similar devices that include at least a display area capable of displaying graphic content. The apparatus of the present disclosure is particularly well suited to applications that use images generated from a smartphone or other type of portable, personal communications device, as can clearly be seen from the values given in the preceding Table. In some embodiments the image generator 24 is a smartphone device that incorporates at least one of: GPS sensor, a first camera for viewing and taking pictures of a scene viewed by the user, and an additional camera "selfie camera" that is facing in a direction opposite of the first camera.

Image generator 24 can be any image producing source, and does not have to be capable of being used as an image display device by the human eye. According to some embodiments the image generator is a screen with an image projection projected on it by another device (e.g., a projector).

Other types of image generators that can be suitably adapted for generating image-bearing light include various types of spatial light modulator (SLM) components. Various types of SLM devices can be used, including a Digital Light Processor (DLP) from Texas Instruments, Dallas, Tex.; a liquid crystal device (LCD), an organic light emitting diode (OLED), an LCOS (liquid crystal on silicon) device, or a grating electromechanical device, for example. A linear light modulator could alternately be used.

Optional field lenses can be provided to appropriately shape the image field provided by the image generator, such as to help reduce distortion.

Beam Splitter Plate 26

Advantageously, with embodiments described herein, only beam splitter plate 26 lies in the line of sight 12 of the viewer. This arrangement provides a horizontal field of view (FOV) for the object scene content that is very wide, with a view that is only slightly offset vertically from an unobstructed line of sight by the glass plate.

According to an embodiment, beam splitter plate 26 can be formed on a glass substrate having surfaces that are parallel to within tight tolerances, such as to within less than 50 arc seconds, more advantageously within 30 arc seconds, or even within 20 arc seconds. In some embodiments glass substrate of the beam splitter 26 has surfaces that are parallel to within less than 10 arc seconds (e.g., 8 to 10 arc seconds). Parallel surfaces are highly advantageous, minimizing ghosting and other effects that can result from even slightly wedged beam splitter surfaces.

Beam splitter plate 26 can be formed on a sheet of glass obtained using fusion draw processing. This method provides a glass sheet with highly parallel opposite sides. Standard types of glass may require double-sided polishing to reduce ghosting which can occur if beam splitter plate surfaces are not highly parallel.

Ideally, beam splitter plate 26 is as thin as possible, to allow for as large a field of view as possible. In some embodiments, the beam splitter plate 26 has a width less than 4 mm, more preferably less than 3 mm, even more preferably less than 2 mm, and even more preferably less than 1 mm (for example, 0.3 to 0.7 mm). By incorporating a beam splitter having such small thickness, when the image-bearing light is reflected off of both surfaces toward the viewer's eye, the distance between these two reflections is small enough that the viewer does not "see" a double image. In some embodiments the beam splitter plate 26 has a first and a second major surfaces and these surfaces of the beam splitter plate are parallel tone another to within 50 arc seconds. In some embodiments the beam splitter plat 26 has a first and a second major surfaces and these surfaces of the beam splitter plate are parallel to one another to within 1 arc minute, or to within 75 arc seconds, more preferably within 55 arc seconds, within 45 arc seconds, and even more preferably to within 40 arc seconds. In some embodiments the beam splitter plat 26 has a first and a second major surfaces and these surfaces of the beam splitter plate are parallel to one another to within 30 or even within 20 arc seconds. The beam splitter plate may be made, for example fusion formed glasses available from Corning Incorporated and may have surfaces parallel to within 10 arc seconds (e.g., 4 to 10 arc sec. In some embodiments, the beam splitter plate 26 has a flatness less than 20 microns, peak to valley (PV) and a variation of thickness less than 0.025 mm (over the central 90% area of the glass (e.g., at least over 95% of the glass area) or at least in the area through which the image is being viewed). In some embodiments, the beam splitter plate 26 has a flatness less than 10 microns (peak to valley) and a variation of thickness less than 0.02 mm (e.g., 0.002 mm to 0.01 mm). In some embodiments, the beam splitter plate 26 has a flatness less than 7 microns PV (e.g., 4 or 5 microns PV) and a variation of thickness less than 0.015 mm, or even 0.01 mm or less (e.g., 0.002 mm, 0.005 mm, or 0.01 mm or therebetween) across a length of a surface that is, for example 75 mm, or 100 mm, or across the length of the beam splitter.

Examples of beam splitter glasses that have a total thickness variation is less than 0.02 mm with surfaces that are parallel to one another within 30 of arc seconds or less are Gorilla® glass, Lotus™ XT glass, Lotus™ NXT glass, or EAGLE XG® glass available from Corning Incorporated, of Corning N.Y. Using glass having such flatness and thickness accuracy leads to greatly improved image quality without ghost images because, in the event the image reflects off of both surfaces, they are so close together that they land on retina in virtually the same location. The beam splitter plate is preferably coated on one side with a partial reflective coating and coated on the other side with an anti-reflection (AR) coating. Peak efficiencies for the display system are obtained when the partial reflector closely approaches 50% reflectivity (meaning an average of 50% reflectance across the visible region of the spectrum), for example when the partial reflector achieves between about 40%-60%, more preferably between about 45-55% reflectance across the visible region of the spectrum, and when there is an anti-reflective coating on the other side. For example, an aluminum metal coating can be applied via evaporative coating techniques to achieve such partial reflectance.

In some embodiments, the anti-reflective coating exhibits less than 10%, more preferably less than 5%, even more preferably less than 2% and most preferable less than 1 or even less than 0.5% reflectivity (meaning an average of less than 0.5% reflectance across the visible region of the spectrum). For example, a dielectric layer or dielectric stack of layers, such as can be applied via evaporative coating techniques, can be utilized to achieve such antireflective properties. This will also block 50% of the light from the real-world object scene. As the reflection of the beam splitter is decreased, the display image gets dimmer and the outside scene gets brighter. Thus, varying these coating parameters can help to balance the light levels from the display and the outside scene.

Lenses L1 and L2

Lenses L1 and L2 can be molded plastic or glass. The choice of material can influence the chromatic aberration of the image. A low dispersion material (Abbe number Vd>40), for example acrylic (PMMA), can be used to reduce the chromatic aberration. Thus, in some embodiments the Abbe V number of the lens(es) L1, L2 is ≥50, even ≥55, for example between 50 and 70, or between 50 and 60. In one exemplary embodiment Vd is about 57.

Lenses L1 and L2 are each monolithic. A monolithic lens is fabricated as a single piece. This distinguishes a monolithic lens from a doublet or other composite lens assembly that is formed by gluing multiple pieces together, such as a doublet for example. In the embodiments described herein lenses L1 and L2, weigh a total of 5 grams to 80 grams (e.g., 40-65 grams).

According to some embodiments lenses L1, L2 are situated in contact with one another. According to some embodiments lenses L1 and L2 are formed together (e.g., molded) as one monolithic component. According to the embodiments described herein the lenses L1, L2 are formed or shaped to provide a space for a viewer's nose to fit at least partially therebetween. For example lenses L1, L2 may be molded together as a monolithic structure with a notch or a chamfer so as to create a "nose insertion space" therebetween.

According to some embodiments the reflective and refractive surfaces of lenses L1 and L2 are structured such that said optical axes of the lenses are parallel to each other within 1 minute of arc and spaced by each other by a distance between 50 mm and 80 mm (e.g., 60 mm-70 mm).

A reflective coating 20' is applied against the convex outer surface 20) of the meniscus lens L1 (or/and L2). The reflective coating is a dichroic coating according to an embodiment. Alternately, a metallic coating can be applied.

As described above, Lenses L1 and L2 can be formed joined together as a single molded assembly. Alternately, Lenses L1 and L2 can be fabricated by diamond turning. Typical lens thickness may be 4-10 mm, for example 5 to 9 mm.

In one exemplary embodiment the lenses L1, L2 are acrylic, each lens has a center thickness of 8 mm and two aspheric surfaces 20, 22 described by the following equation $$z = \frac{cr^2}{1 + \sqrt{1 - (1+k)c^2 r^2}} + Ar^4 + Br^6 + Cr^8$$

where r is the radial distance (along the lens surface from its vertex, z is the sag of the surface at the height r, c is surface curvature (c=1/Ri, where Ri is the radius of the surface i), k is a conic constant and A, B and C are higher order aspheric coefficients. In the exemplary embodiments disclosed herein aspheric surfaces 20 and 22 have at least one of the aspheric coefficient A, B, or C that is non zero. For example, in the embodiment of Table 2, below, aspheric coefficients A, B and C associated with the lens surface 20 of lenses L1, L2 are all non-zero.

TABLE 2

| Surface | Radius | K | A | B | C |
|---|---|---|---|---|---|
| 1 | −170.766 | 0 | 2.59E−06 | −1.90E−09 | 0 |
| 2 | −137.478 | 0 | 5.46E−07 | −1.64E−10 | −2.97E−13 |

In Table 2 Surface 1 corresponds to the concave refractive surface 22, surface 2 corresponds to the convex surface 20 that has a reflective coating thereon. In this embodiment, distance from the vertex of surfaces 22 to the surface 24' of image generator 24 is 55.28 mm. The distance between beam splitter 26 and lens L1, L2 is chosen so that the beam splitter is aligned to pupil(s) P. In this embodiment the lenses L1, L2, are molded. In alternative embodiments surfaces 20, 22 can be diamond turned.

Packaging Options

The apparatus of the present disclosure can be assembled as part of a head-mounted device, using conventional eyeglass-type frames, headband, or other mechanisms that mount the display against the head. The apparatus can alternately be coupled to a head covering, hat, or helmet, depending on the intended application.

Embodiments of the present disclosure can take advantage of the small component count, relaxed tolerances, reduced weight, and structural rigidity of the beam splitter plate 26 substrate to allow a number of improved packaging arrangements for display apparatus 30.

Figures 8A, 8B:
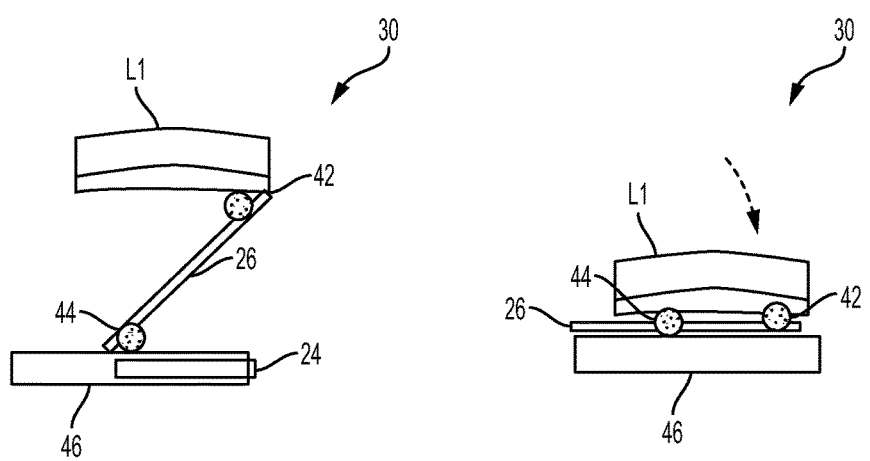
FIGS. 8A and 8B are side views of a foldable packaging arrangement for a display apparatus according to an embodiment of the present disclosure.

The side views of FIGS. 8A and 8B show a simplified diagram for a foldable version of display apparatus 30 according to an embodiment of the present disclosure. Beam splitter plate 26 is flexibly coupled to lenses L1 and L2 by a first hinge 42 or other type of flexible coupling, such as along an edge of beam splitter plate 26. A second hinge 44 couples beam splitter plate 26 to a housing or frame 46 that supports image generator 24, such as a housing for temporary insertion and easy removal of a smartphone device, for example. FIG. 8A shows display apparatus 30 in configuration for viewing. FIG. 8B shows display apparatus 30 folded for carrying or storage, with image generator 24 removed. It can be appreciated that numerous possible mechanical arrangements can be devised for providing a version of display apparatus 30 that is foldable with respect to the vertical direction, using only a small number of mechanical components.

Figure 9:
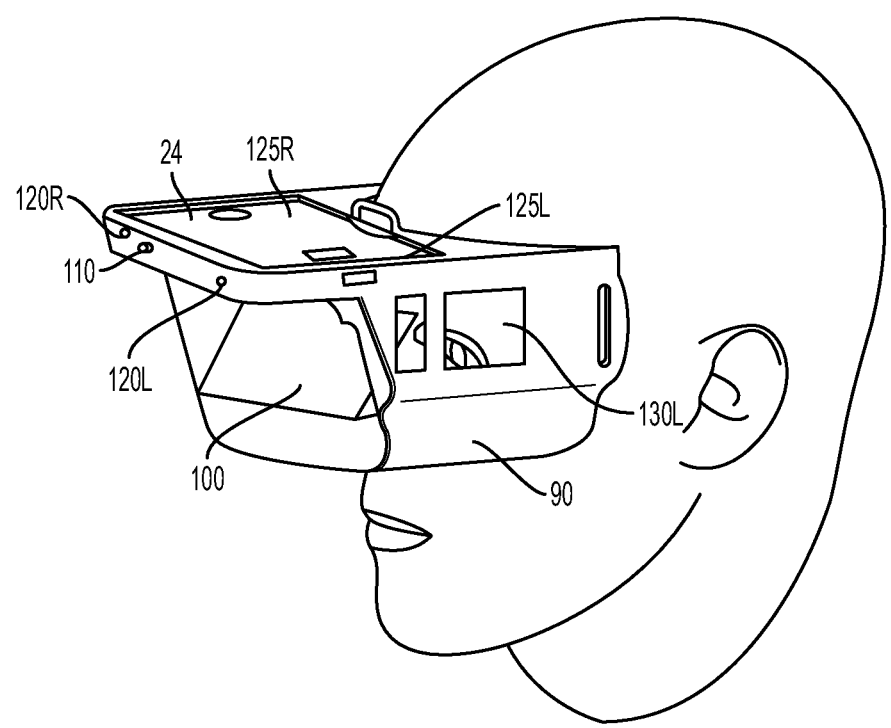
FIG. 9 illustrates an embodiment of the display apparatus in a mechanical housing with a protective shield and peripheral windows.

FIG. 9 illustrates one embodiment of the display apparatus 30 that comprises a mechanical housing 90. In this embodiment the image generator 24 (e.g., a phone with display surface 24', not shown) is mounted in a housing 90 above the eye level. Surface 24' is oriented so that it faces optical components situated inside, within the housing 90. The light from a physical scene that the viewer is looking at is transmitted through the beam splitter 26 (situated inside the housing 90) along the line of site 12 (see FIG. 1) to the viewer's eyes and is combined with the light from the image generator 24, to form an augmented reality (AR) image. The housing 90 also supports an outer protective shield 100. Outer protective shield 100 can be made from plastic such as polycarbonate to protect the optical components of the display apparatus 30 from dust and damage. Outer protective shield 100 may also comprise scratch resistant tempered glass, for example Gorilla® glass available from Corning Incorporated of Corning, N.Y. The protective shield can be coated with an anti-reflective coating or an absorbing coating that controls the amount of light from the reality scene that gets to the viewer's eyes. For example, in some embodiments the outer protective shield 100 may comprise photochromic material, or a polarizer. In this embodiment the light from a physical scene enters the display apparatus 30 through outer protective shield 100 and superimposed with light provided by the image generator 24.

Also shown in FIG. 9 is a power activator 110 (e.g., a spring plunger, or a button, or another component), which is at least partially situated within housing 90, and pushes against the power button on the image generator 24, when engaged by the user to turn on the image generator.

Also shown in FIG. 9 are windows 130L situated on sides of housing 90, so that the viewer/device user has a view of the periphery. There is a corresponding window 130R cut into the right side of the housing 90.

Figure 10:
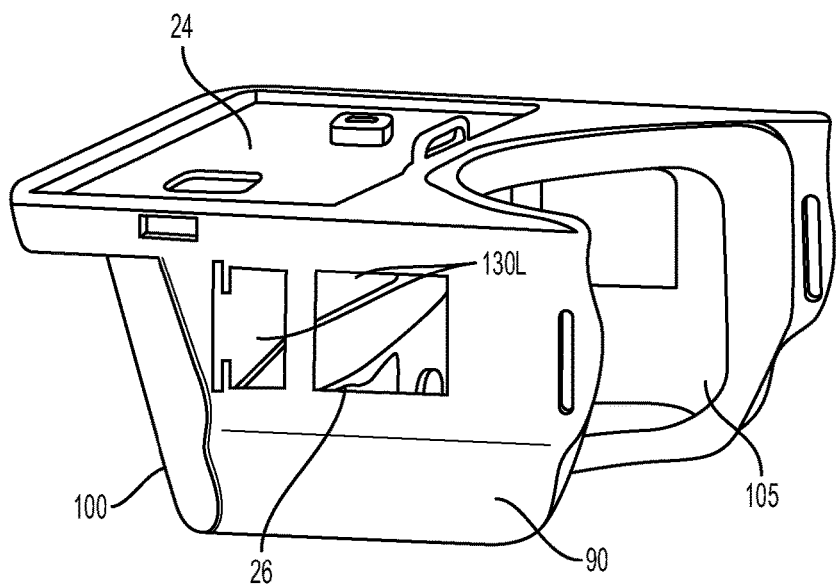
FIG. 10 illustrates the display apparatus of FIG. 9, with protective shields on the outside and inside of the optical system situated therebetween.

FIG. 10 illustrates the outer protective shield 100 and an inner protective shield 105 of the display device of FIG. 9. The inner protective shield 105 also protects the optical components from dust, etc., and in addition may serve as additional protection for viewer's eyes from UV light (e.g., if it has a UV coating thereon), or from other environmental damage. Both shields 100 and 105 may be made from polycarbonate. The inner protective shield 105 can be coated with an anti-reflective coating to reduce stray light and glare. Therefore, according to some embodiments the display device 30 includes a curved protective shield 100 made from polycarbonate that transmits the light from the physical scene before being combined by the beam splitter. According to some embodiments the display device 30 further includes a curved protective shield 105 made from polycarbonate that transmits the light from the physical scene after being combined by the beam splitter. According to some embodiments the curved protective shield 105 includes an anti-reflective coating on a side facing the viewer. According to some embodiments the protective shield 100 includes an anti-reflective coating on a side facing the viewer. According to some embodiments at least one of the protective shields 100, 105 includes an oleo phobic and/or an anti-fog coating (not shown).

Figure 11:
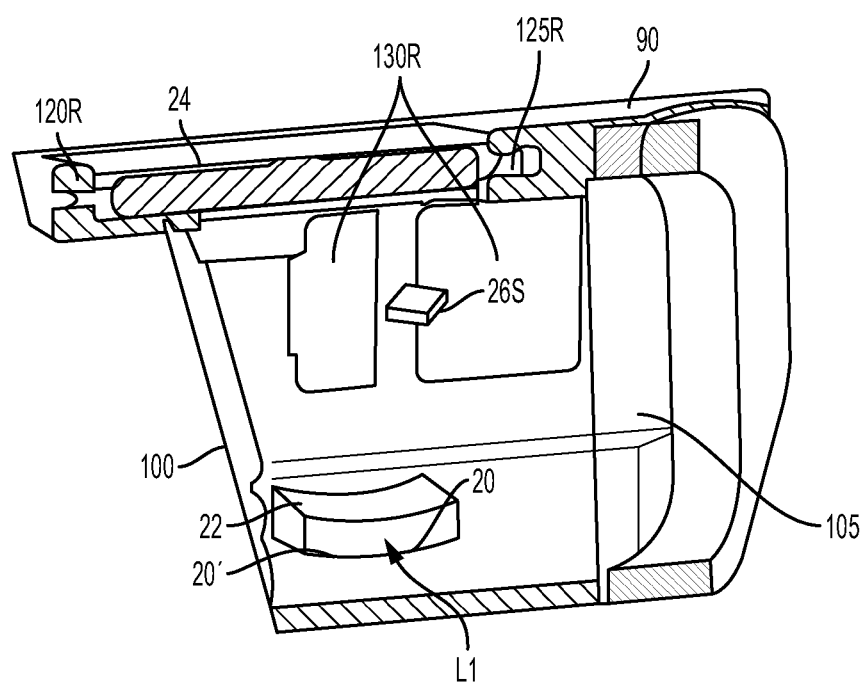
FIG. 11 is a cross section of the display apparatus showing the adjustment mechanism for rotating the image generator.

The image generator 24 can be aligned by rotating the image generator using set screws 120R and 120L as they apply force to spring plungers 125R and 125L through the image generator 24. FIG. 11 is a cross-sectional view of the display apparatus mounted in housing 90. In this figure, 120R is a set screw that applies force through the image generator 24 to a spring plunger 125R. The corresponding set screw 120L and spring plunger 125L are also used to rotate the image generator 24 about the principal axis A.

According to some embodiment the display device 30 includes a means of adjusting the rotation of the image generator about an axis parallel to the principal axis of the reflective surface. FIG. 11 also illustrates that housing 90 comprises an internally molded support structure 26s for supporting beam splitter 26.

Figure 12:
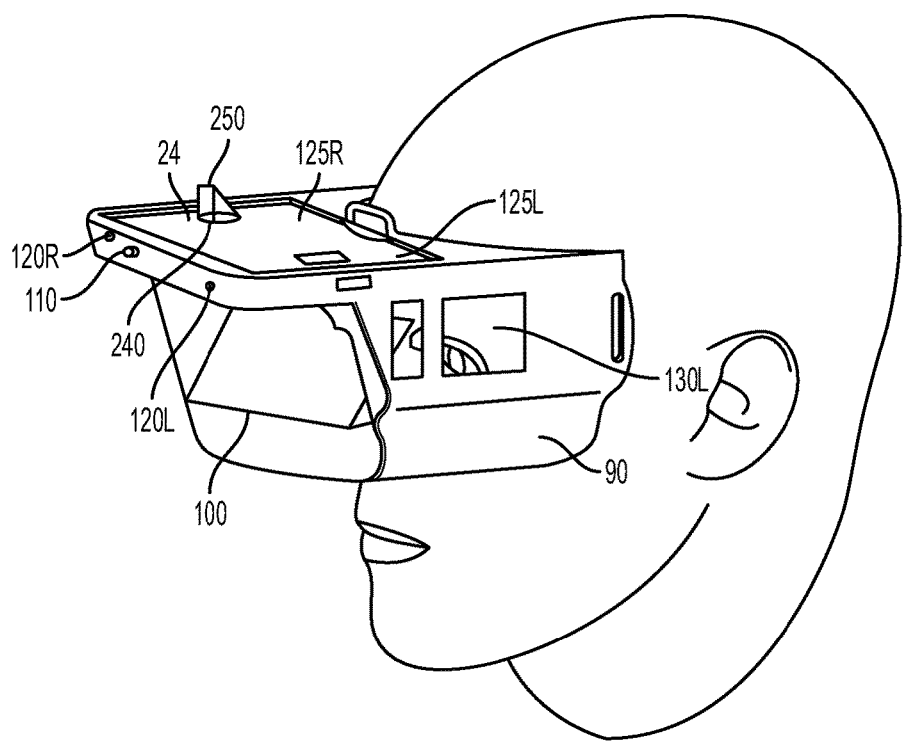
FIG. 12 illustrates an embodiment of the display apparatus, including image generator in a mechanical housing with an optical component for folding the viewing direction of image generator that is situated over the camera.

FIG. 12 is similar to FIG. 9, but in addition illustrates a display apparatus that comprises optical component 250 that folds the viewing direction of an imaging system 240 associated with the image generator 24. For example, in FIG. 12 embodiment, the image generator 24 is a cell phone that includes a camera 240 (imaging system of the cell phone). An optical component 250, such as a folding mirror or a prism is situated adjacent to the camera 240. The optical component 250 is structured to fold the viewing direction of a camera. Thus, the camera can "view" or "see" at least a portion of the view viewed by the viewer through the beam splitter. That is, the camera with the help of the optical component 250 can "look" in the same direction that the viewer is looking at. For example, in some embodiments, the optical component 250 comprises a reflective surface such that the field of view of the camera includes the line of sight of the viewer through the beam splitter. The reflective surface can be formed, for example, by a reflective coating. The display device may further incorporate at least one imaging system 240' (for example a camera in a cell phone that is structured and positioned to take ("selfie") pictures of the end user. Imaging system 240' (e.g., camera lenses) is adapted, or example in conjunction with optical folding optical components 250' (that may be similar to that of optical component 250 described above) to "look" through the beam splitter at the viewer's eyes, and thus track where the viewer is looking.

Figure 13:
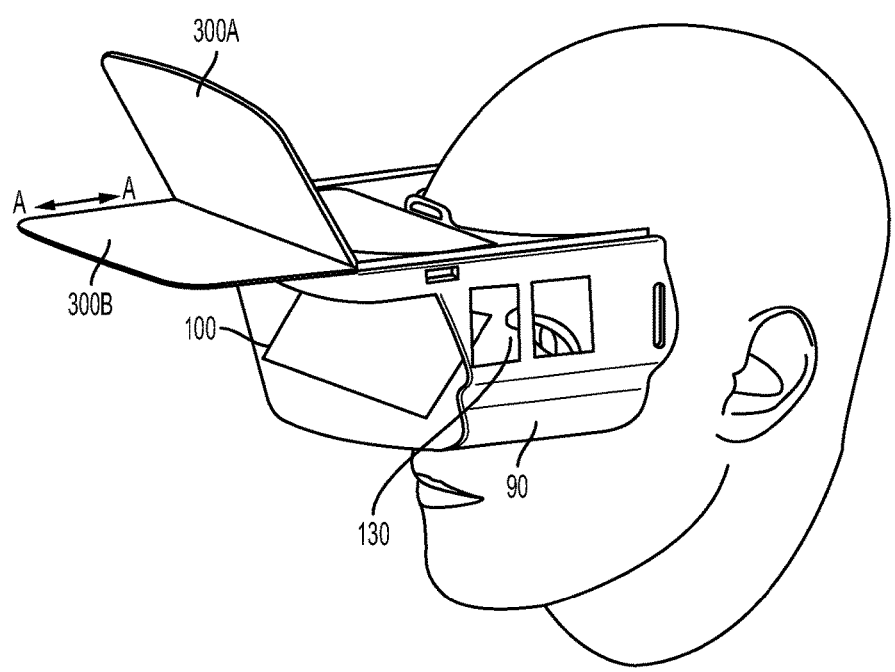
FIG. 13 illustrates an embodiment of the display apparatus in a mechanical housing that includes a visor for sun glare minimization.

FIG. 13 is also similar FIG. 9, but in addition illustrates that display apparatus comprises at least one visor 300A, 300B, for blocking the sun (for sun glare minimization). In the embodiment illustrated, visor 300A is hinged and its position (angle) can be adjusted by the viewer, as needed. An alternative visor 300B is slide-able in and out of position, as needed, in the directions indicated by the errors A-A. According to some embodiments (not shown) side visors may also be deployed over the side windows (and peripheral windows 130L, 130R). Visors 300A, 300B, as well as the side visors may be opaque, or may comprise a polarizer or a comprise photochromic material, for minimizing sun glare.

According to some embodiments (not shown), the display apparatus comprises at least one of: a GPS sensor, at least one head tracking sensor, eye tracking sensors, accelerometer, or a camera situated between the two lenses that "looks" through the beam splitter at viewer's eyes.

Figure 14:
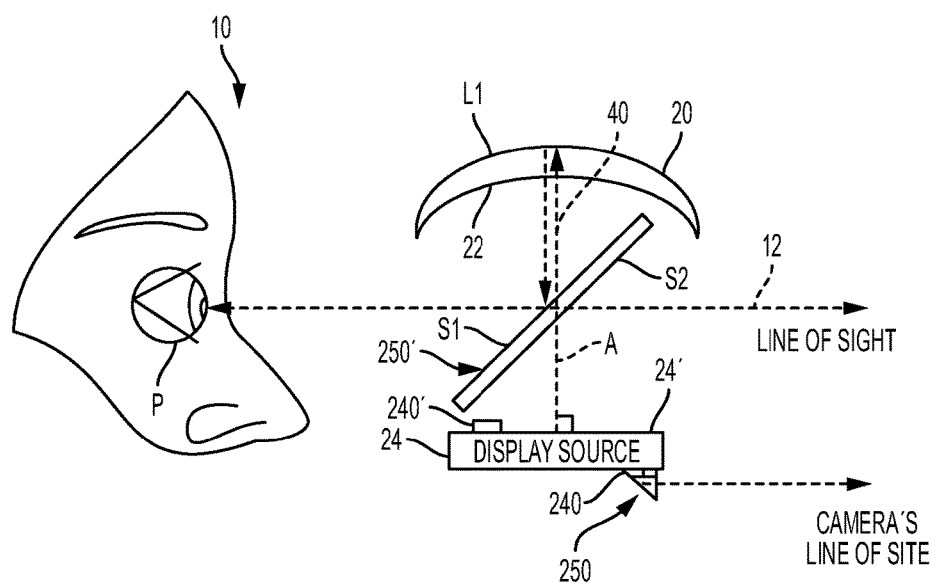
FIG. 14 illustrates another embodiment of the display apparatus described herein

It is noted that in the embodiments shown in FIGS. 9-12 the image generator 24 is situated above the viewer's eye, and the lens is situated below viewer's eyes. However, in all of the embodiments disclosed herein, the image generator 24 may be situated below the viewer's eye, and the lens L1 is situated above viewer's eyes. That is, the device orientation is "flipped" 180 degrees relative to that shown in FIGS. 9-12, which has an advantage of advantage of minimize sun glare, because the sun rays are prevented from striking the refractive surface of the lenses L1, L2. (See, for example, FIG. 14). FIG. 14 also illustrates that this exemplary embodiment of the display apparatus comprises at least one camera 240 and at least optical component 250 that folds the camera's line of sight such that it is substantially parallel with the line of sight of the viewer. The camera(s) 250 can be used to capture the images seen by each eye(s) so that the virtual portion of the AR overlay the (image provided by the image generator 24) can be placed in the proper location (for each eye) into the actual scene viewed by the viewer.

It is noted that the device of FIGS. 9-12 may utilize two image generators 24R, 24L, as shown, for example in FIGS. 4A and 5A. Utilizing two small image generators 24R, 24L, advantageously reduces the size of the overall display apparatus. These image generators 24r, 24L may be situated either blow, or above the viewer's eyes. The display device may further incorporate one or two cameras 240' (as shown schematically in FIG. 14) that are adapted or structured for example, in conjunction with optical folding optical components 250' to "look" through the beam splitter at the viewer's eyes, and thus track where the viewer is looking. For example, an imaging system or a cameras 240' may be situated near or adjacent to the image v generators 24R, 24L. Alternatively, one or more cameras 240' may be situated between the two lenses that "look" through the beam splitter at viewer's eyes. Cameras 240' may also be positioned elsewhere in the display device, for example adjacent to, or situated on the protective shields 100 or 105 such that they can track position of viewer's eyes (or eye pupils). These cameras 240' alone, or in conjunction with other optical components can track the eyes so that the position of the real scene looked at by the viewer is "known" to the display device, and virtual portion of the AR overlay can be placed in the proper location (for each eye) into the actual scene viewed by the viewer. As described above, this be accomplished, for example, through multiple cameras, using a lens/prism system, an/or a reflector to multiplex the image(s) into proper locations. Additionally, one can use software algorithms in conjunction with one or more eye tracking cameras (or user's line of site tracking camera(s) to create a proper overlay of virtual image on a real/actual scene that the viewer is looking at.

Accordingly, as described herein, some embodiments of the display system further comprise at least one of: a GPS sensor, at least one eye (or eye tracking) tracking sensor, an accelerometer, or a camera that looks through at either the viewer's eyes or the scene viewed by the viewer.

It should also be noted that, for embodiments in which augmented reality is not desirable and only an electronically generated image is desired, light from the real world object scene can alternately be blocked for one or both eyes, such as by a shield.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A display apparatus for displaying augmented reality images to a viewer, said display apparatus comprising:
   a display source that generates a field of image-bearing light from a surface;
   a lens spaced apart from the display source, said lens having a concave refractive surface and having a concave reflective surface; and
   a beam splitter plate disposed in free space in an optical path between the display source and the lens, such that an object scene can be viewed by the viewer through the beam splitter plate, said beam splitter plate having first and second substantially parallel surfaces that are oblique to a line of sight of the viewer,
   wherein the lens and the beam splitter plate define a viewer eye box for the image-bearing light along the line of sight of the viewer such that the line of sight of the viewer for the object scene extends through beam splitter plate, and wherein:
   (i) a focal length of the lens is between 38 mm and 64.7 mm;
   (ii) said display apparatus defines a horizontal field of view H, wherein 30 degrees≤H≤60 degrees; and
   (iii) the beam splitter plate has a length between 100 mm and 170 mm.

2. The display apparatus of claim 1, wherein an optical thickness between surfaces of the beam splitter plate is less than 3 mm.

3. The display apparatus of claim 1, wherein the beam splitter plate weighs less than 25 grams.

4. The display apparatus of claim 1, wherein said display apparatus has a resolution of 4 min/pixel or less.

5. The display apparatus of claim 1, wherein said display apparatus has a resolution of 2.3 min/pixel or larger.

6. The display apparatus of claim 1, wherein said lens has at least one aspheric surface.

7. The display apparatus of claim 1, wherein said concave reflective surface faces the viewer and said beam splitter plate is situated between the viewer and said lens.

8. The display apparatus of claim 1, wherein a principal axis of the reflective surface is normal to the display source.

9. The display apparatus of claim 1, wherein the lens intersects the line of sight of the viewer.

10. The display apparatus of claim 1, wherein the beam splitter plate is disposed between the display source and the viewer.

11. The display apparatus of claim 1, wherein the beam splitter plate is disposed between the lens and the viewer.

12. The display apparatus of claim 1, structuring such that the viewer directly faces the beam splitter plate.

13. The display apparatus of claim 1, said display system having an eye relief distance of 16 to 30 mm.

14. The display apparatus of claim 1, wherein each eye of the viewer views the object scene through said beam splitter plate.

15. The display apparatus of claim 1, wherein the apparatus includes a structure to include a mechanical component so as to be foldable.

16. The display apparatus of claim 1, wherein the display apparatus is wearable by the viewer.

17. The display apparatus of claim 1, wherein the beam splitter plate is formed using a fusion draw process.

18. The display apparatus of claim 1, wherein the first and second surfaces of the beam splitter plate are parallel to within less than 50 arc seconds.

19. The display apparatus of claim 1, wherein the beam splitter plate is a polarization beam splitter and further comprising a quarter wave plate disposed between the beam splitter plate and the lens.

20. The display apparatus of claim 1, further comprising a field lens in the path of the image-bearing light.

21. The display apparatus of claim 1, wherein the display source comprises an organic light-emitting diode.

22. The display apparatus of claim 1, wherein the display source comprises a personal communications device.

23. The display apparatus of claim 1, wherein the display source is a smart phone.

24. The display apparatus of claim 1, wherein said display source generates a flat field of image-bearing light from the surface that is a flat surface.

25. The display apparatus of claim 1, wherein said lens has a center and said center is spaced apart from said display source.

26. A display apparatus comprising:
a) a flat display source;
b) a lens spaced apart from the display source and having a concave refractive surface and a concave reflective surface, and
c) a beam splitter plate disposed in an optical path between the display source and the lens and along a line of sight of a viewer viewing a real-world object scene, the beam splitter plate having first and second parallel surfaces oblique to the line of sight of the viewer,
wherein the beam splitter plate is further disposed to provide image-bearing light from the display source to the lens, and wherein the beam splitter plate and lens define the optical path that conveys the image-bearing light for a first refraction through refractive surface, reflects the refracted light from the reflective surface, and refracts the reflected light from the refractive surface back to the beam splitter, said beam splitter plate provides the light toward the viewer along the line of sight of the viewer, and wherein:
(i) a focal length of the lens is between 38 mm and 64.7 mm;
(ii) said display apparatus defines a horizontal field of view H, wherein 30 degrees≤H≤60 degrees; and
(iii) the beam splitter plate has a length that is between 100 mm and 170 mm.

27. A display apparatus comprising:
a) a flat display source;
b) an optical component having a concave reflective surface, and
c) a beam splitter plate disposed in space between the display source and the reflective surface, wherein said display apparatus defines a horizontal field of view H, wherein 30 degrees≤H≤70 degrees, and the beam splitter plate has a length that is between 100 mm and 170 mm.

28. The display system of claim 26, wherein the line of sight for the object scene extends through beam splitter plate and the lens.

29. A display apparatus comprising for displaying augmented reality images to a viewer, said display apparatus comprising:
a display source that generates a field of image-bearing light from a surface;
a lens spaced apart from the display source and, said lens having a concave refractive surface and a concave reflective surface; and
a beam splitter plate disposed in space along an optical path between the display source and the lens, said beam splitter plate having first and second substantially parallel surfaces that are oblique to a line of sight of the viewer, wherein
the lens and the beam splitter plate define a viewer eye box for the image-bearing light along the line of sight of the viewer such that the line of sight for an object scene extends through beam splitter plate and the lens.

30. The display apparatus of claim 29, wherein:
the beam splitter plate has a length between 100 mm and 170 mm; or a focal length of the lens is between 38 mm and 64.7 mm.

* * * * *